(12) United States Patent
Tseng et al.

(10) Patent No.: US 7,401,870 B2
(45) Date of Patent: Jul. 22, 2008

(54) METHOD AND APPARATUS TO ENHANCE BRAKE-STEER OF A VEHICLE USING A CONTROLLABLE SUSPENSION COMPONENT

(75) Inventors: Hongtei E Tseng, Canton, MI (US); Timothy G. Offerle, Whittaker, MI (US); Gregory P. Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 567 days.

(21) Appl. No.: 10/708,680

(22) Filed: Mar. 18, 2004

(65) Prior Publication Data

US 2005/0206234 A1 Sep. 22, 2005

(51) Int. Cl.
*B60T 8/60* (2006.01)
(52) U.S. Cl. .............. 303/146; 303/148; 303/149; 180/6.2; 701/48
(58) Field of Classification Search ........ 303/146, 303/147, 148, 149, 3, 15, 20, 191; 701/48, 701/36, 41, 42, 58, 70; 280/771, 773, 703, 280/772; 180/6.2, 170
See application file for complete search history.

(56) References Cited

U.S. PATENT DOCUMENTS

| | | | |
|---|---|---|---|
| 4,227,716 A * | 10/1980 | Nordstrom | 280/124.175 |
| 4,903,983 A * | 2/1990 | Fukushima et al. | 280/5.503 |
| 5,134,352 A | 7/1992 | Matsumoto et al. | |
| 5,172,961 A | 12/1992 | Inoue et al. | |
| 5,549,319 A * | 8/1996 | Kring | 280/86.75 |
| 5,560,640 A * | 10/1996 | Lee | 280/5.52 |
| 5,696,681 A | 12/1997 | Hrovat et al. | |
| 6,021,367 A | 2/2000 | Pilutti et al. | |
| 6,059,383 A | 5/2000 | Paggi et al. | |
| 6,076,033 A | 6/2000 | Hamada et al. | |
| 6,132,014 A | 10/2000 | Kiso et al. | |
| 6,338,015 B1 | 1/2002 | Kawagoe et al. | |
| 6,374,162 B1 | 4/2002 | Tanaka et al. | |
| 6,453,226 B1 * | 9/2002 | Hac et al. | 701/48 |
| 6,481,806 B1 * | 11/2002 | Krueger et al. | 303/140 |
| 6,588,858 B2 * | 7/2003 | Ritz et al. | 303/140 |
| 6,612,394 B2 | 9/2003 | Wessman | |
| 6,804,594 B1 * | 10/2004 | Chen et al. | 701/42 |
| 6,813,552 B2 * | 11/2004 | Ghoneim et al. | 701/70 |

FOREIGN PATENT DOCUMENTS

| | | |
|---|---|---|
| DE | 36 25 025 C1 | 7/1986 |
| DE | 42 24 887 A1 | 7/1992 |
| EP | 0 295 396 A2 | 4/1988 |
| GB | 2 188 012 A | 9/1987 |

* cited by examiner

*Primary Examiner*—Robert A. Siconolfi
*Assistant Examiner*—Mariano Sy
(74) *Attorney, Agent, or Firm*—Greg Brown; Dickinson Wright PLLC

(57) ABSTRACT

A system and method of controlling an automotive vehicle having a controllable suspension component includes applying brake-steer to at least one wheel, generating a suspension control signal in response to the brake-steer signal, and allowing at least one wheel coupled to the suspension component to articulate to reduce the turning radius of the vehicle.

16 Claims, 11 Drawing Sheets

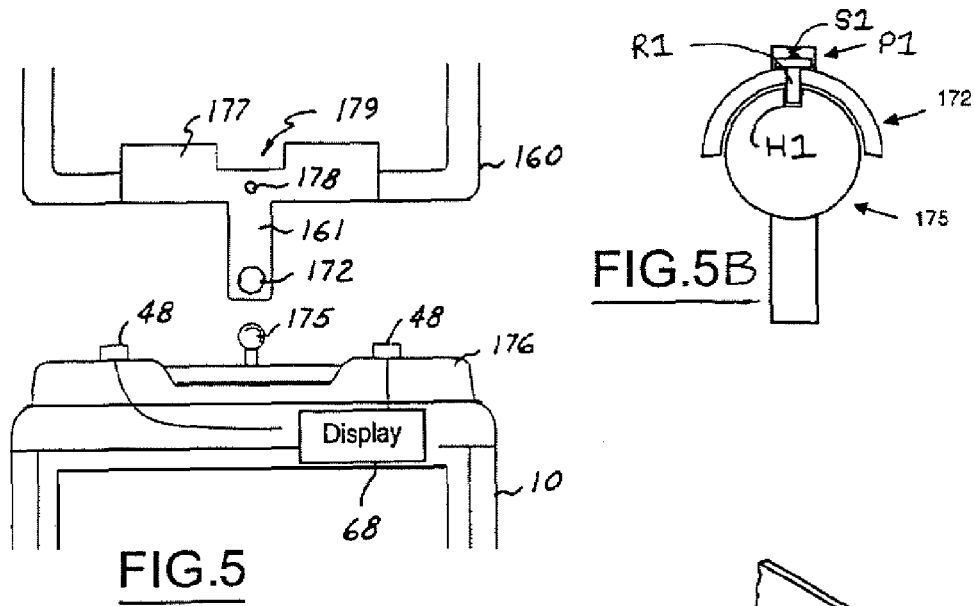
FIG.5
FIG.5B
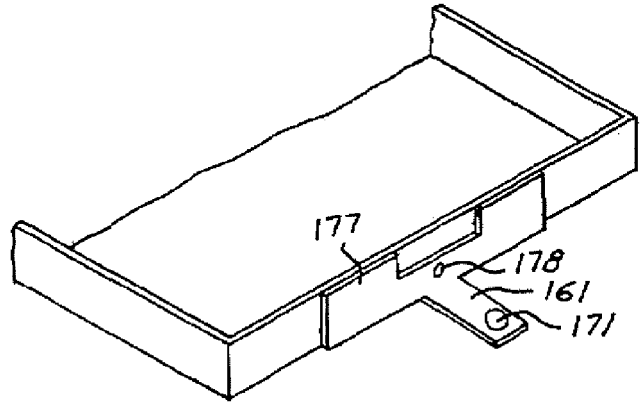
FIG.5A
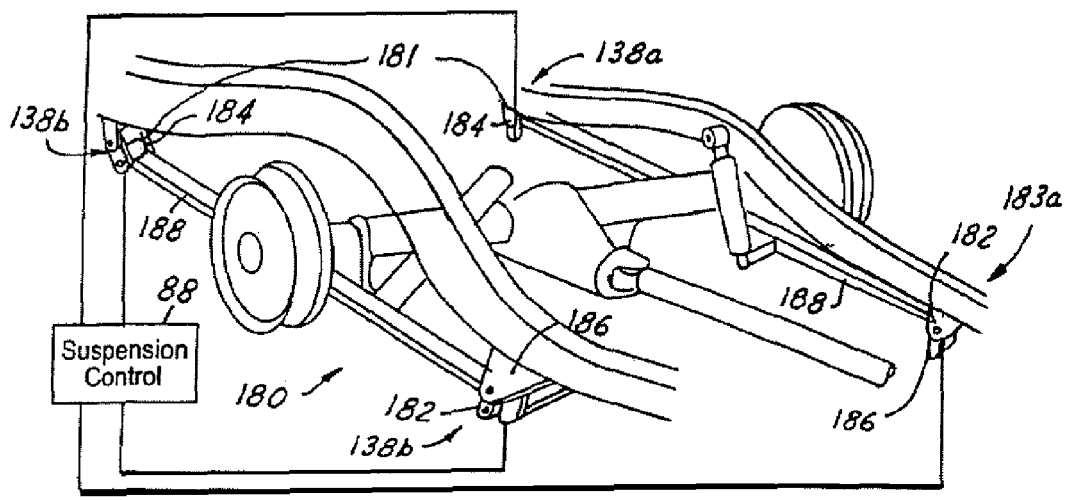
FIG.6

METHOD AND APPARATUS TO ENHANCE BRAKE-STEER OF A VEHICLE USING A CONTROLLABLE SUSPENSION COMPONENT

CROSS REFERENCE TO RELATED APPLICATIONS

The present invention is related to U.S. application Ser. Nos. 10/708,668, 10/708,669, 10/708,670, 10/708,671, 10/708,672, 10/708,673, 10/708,675, 10/708,676, 10/708, 677, 10/708,679, 10/708,681 and 10/708,682 all filed Mar. 18, 2004, each incorporated by reference herein.

BACKGROUND OF INVENTION

The present invention relates generally to a dynamic control system for an automotive vehicle, and more particularly, to a method and apparatus for brake-steer the vehicle and further reducing the turning radius of the vehicle using a controllable suspension component.

Dynamic control systems for automotive vehicles have recently begun to be offered on various products. Dynamic control systems typically control the yaw of the vehicle by controlling the braking effort at the various wheels of the vehicle. Yaw control systems typically compare the desired direction of the vehicle based upon the steering wheel angle and the direction of travel. By regulating the amount of braking at each corner of the vehicle, the desired direction of travel may be maintained.

Such systems typically include the capability of controlling one wheel or multiple wheels individually. That is, the vehicle wheels may be braked individually. Individual braking is typically performed on a demand basis for a relatively short time to stabilize the vehicle. Further, a vehicle wheel may be provided with a different torque than the other wheels. This may be desirable to perform certain controls in dynamic stability control systems.

Large vehicles such as full-size sport utility vehicles, pickup trucks, and heavy duty trucks have a large turning radius. Such vehicles may be used to pull trailers. It would be desirable to improve the turning characteristics of these vehicles by reducing the turning radius. It would also be desirable to improve the trailering characteristics of a vehicle.

One system that is known to improve the turning characteristics of the vehicle is a four wheel steer system. By steering the rear wheels in the opposite direction of the front wheels in low speed, the turning radius of the vehicle is reduced. Four wheel steering is also capable of improving the trailerability of a vehicle in high speed. One drawback to such a system is that the system adds another steering actuator to the vehicle. This increases the cost, complexity, warranty, maintenance costs and weight of the vehicle. In contrast, it is typically the objective today to reduce the cost and weight of vehicles.

It would therefore be desirable to improve the turning capability and trailerability of vehicles without incurring the drawbacks of a four wheel steering system.

SUMMARY OF INVENTION

The present invention provides a method for controlling a suspension component to further reduce the turning radius of the vehicle.

In one aspect of the invention, a method of controlling an automotive vehicle having a controllable suspension component includes applying brake-steer to at least one wheel, generating a suspension control signal in response to the brake-steer signal, and allowing at least one wheel coupled to the suspension component to articulate to reduce the turning radius of the vehicle.

In a further aspect of the invention, a vehicle comprises a controllable suspension component and a controller coupled to the controllable suspension component. The controller determines a brake-steer condition and generates a suspension control signal in response to the brake-steer condition. The controllable suspension component reduces the turning radius of the vehicle in response to the suspension control signal.

One advantage of the invention is that an electrically controllable suspension component is less expensive than providing a rear actuator. Therefore, the system according to embodiments of the invention may be implemented with lower costs.

Other advantages and features of the present invention will become apparent when viewed in light of the detailed description of the preferred embodiment when taken in conjunction with the attached drawings and appended claims.

BRIEF DESCRIPTION OF DRAWINGS

FIG. 5 is a perspective view of a trailer locating plate coupled to a trailer tongue relative to the vehicle.

FIG. 5A is a perspective view of the toe locating plate of FIG. 5.

FIG. 5B is a top view of an apparatus for determining the position of the trailer.

FIG. 6 is a perspective view of a Hotchkiss suspension having an active compliant suspension component according to the present invention.

DETAILED DESCRIPTION

Figure 1:
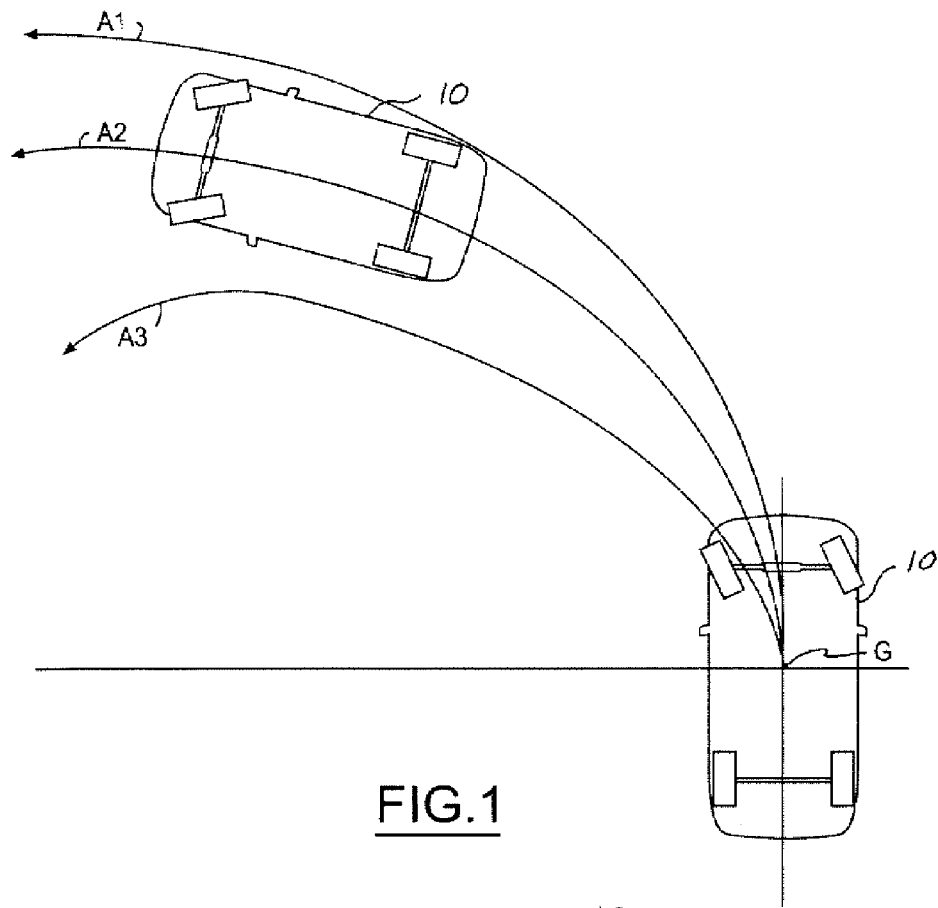
FIG. 1 is plot of a vehicle traveling along three curves corresponding to a conventional vehicle and two embodiments of the invention.

In the following figures the same reference numerals will be used to identify the same components. The various terms and values are set forth by way of example and are not meant to be limiting unless specifically set forth in a claim.

Referring now to FIG. 1, a vehicle 10 is illustrated traversing three paths. Path A1 is the path a vehicle travels without the invention. Path A2 is a path the vehicle 10 travels with brake-steer. Path A3 is a path the vehicle 10 travels with brake-steer and a controllable suspension component. As is shown, path A2 improves the turning radius over path A1. Path A3 has a reduced or improved turning radius compared to path A2.

The term brake-steer or brake-steering is used to describe changing a characteristic of the vehicle such as the turning radius or tracking of the vehicle using one or more brakes, the application of differential (positive or negative) torques, or a combination of the braking and differential torques. Positive torques may be applied by use of electric drive motors (with or without an electric vehicle), active differentials, or traditional torque distribution methods. Active differentials are capable of diverting all or part of the drive torque to one side of the vehicle or the other. Also, specific configurations may depend on different vehicle arrangements including powertrain, weight, loading, tires and the other desired effects. Vehicles employing such systems will be calibrated and/or adjusted experimentally. The present invention is particularly suitable for use in long wheel base vehicles. However, shorter wheel base vehicles may also benefit from implementation of this invention.

The present invention may be used with various dynamic control systems such as, but not limited to, anti-lock brakes, traction control, roll stability control and yaw control systems. The present invention is discussed below in terms of preferred embodiments relating to an automotive vehicle moving in a three-dimensional road terrain, but it is to be understood that such descriptors are not to be limiting on the full range and scope of the present invention. Further, the various sensors may be used alone or in various combinations depending on the conditions. Other sensors may be used to complement or verify determinations of other sensors. For example, some sensors may be used to check the image or radar signals, or vice versa.

Figure 2:
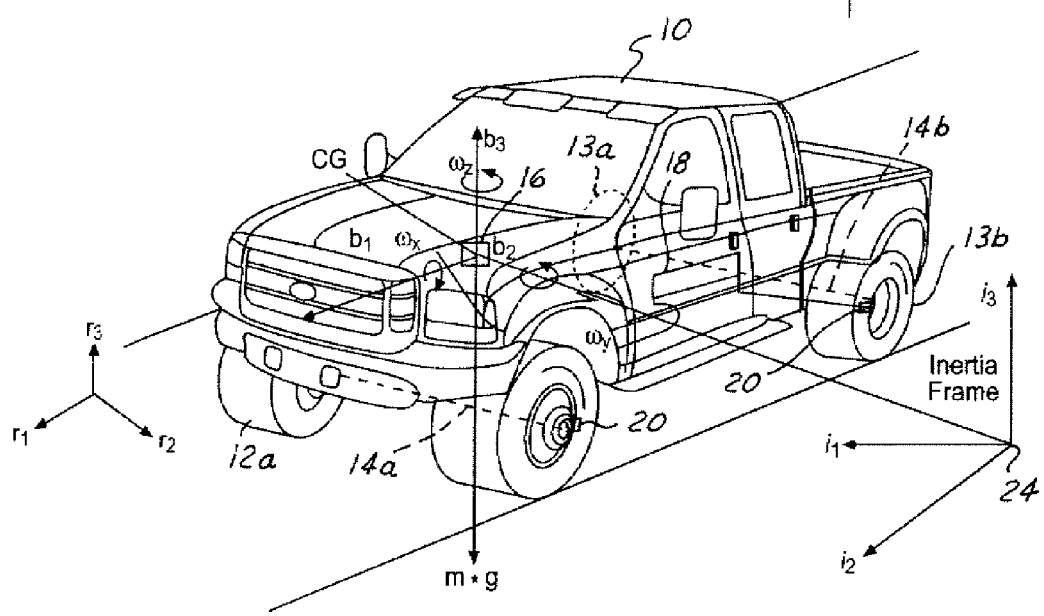
FIG. 2 is a perspective view of an automotive vehicle on a road surface having a control system according to the present invention.

Referring to FIG. 2, an automotive vehicle 10 with a control system of the present invention is illustrated. Vehicle 10 has front right and front left tires 12a and 12b and rear right tires 13a and rear left tires 13a and 13b, respectively. The vehicle 10 may also have a number of different types of front steering systems 14a including having each of the front wheels configured with a respective controllable actuators and the front wheels having a conventional type system in which both of the front wheels are controlled together. The vehicle has a rear axle system 14b. Generally, the vehicle has a weight represented as Mg at the center of gravity of the vehicle, where g=9.8 m/s² and M is the total mass of the vehicle.

The sensing system 16 may share sensors with other vehicle dynamic control systems such as a yaw stability control system sensor set or a roll stability control system sensor set. Of course, the actual sensors used will vary depending on the type of control system or systems implemented on the particular vehicle. The various possible sensors will be further described below. The wheel speed sensors 20 may be mounted as adjacent each wheel of the vehicle. Those skilled in the art will recognize three wheel speed sensors may be used. For example, one for the rear of the vehicle and one for each of the front two wheels. The remaining sensors of sensing system 16 are preferably mounted directly at the center of gravity of the vehicle, along the reference directions x, y and z shown in FIG. 1. As those skilled in the art will recognize, the frame from $b_1$, $b_2$ and $b_3$ is called a body reference frame 22, whose origin is located at the center of gravity of the car body, with the $b_1$ corresponding to the x axis pointing forward, $b_2$ corresponding to the y axis pointing off the left side, and the $b_3$ corresponding to the z axis pointing upward. The angular rates of the car body are denoted about their respective axes as $\omega_x$ for the roll rate, $\omega_y$ for the pitch rate, and $\omega_z$ for the yaw rate. The present invention calculations preferably take place in an inertial frame 24 that may be derived from the body reference frame 22 as described below.

Figure 3:
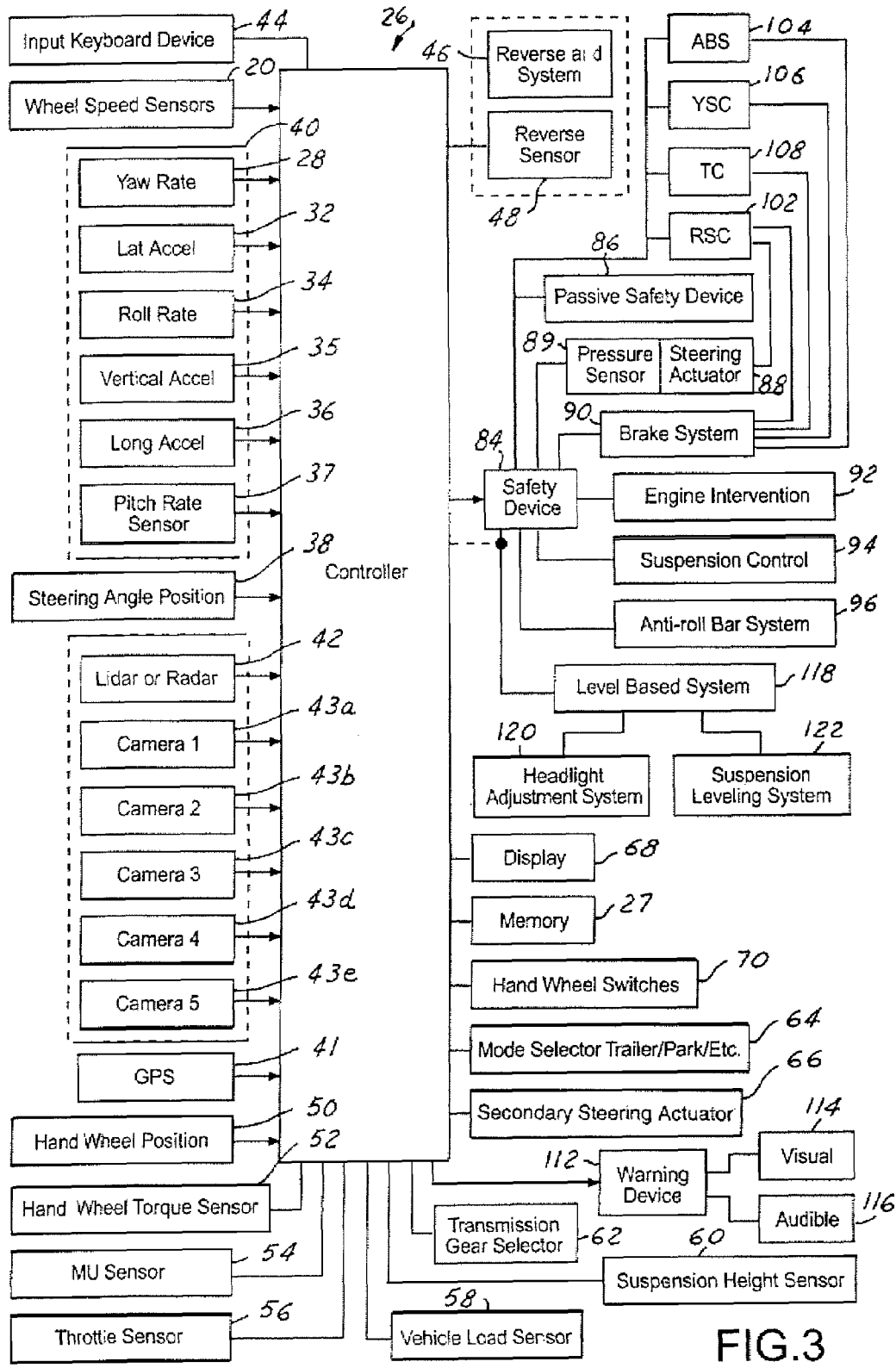
FIG. 3 is a block diagrammatic view of a control system according to the present invention.

As will be described below, the sensing system 16 may also include a lidar, radar and/or sonar sensor(s), camera(s), a GPS system and various other sensors (all of which are shown in FIG. 2 or 3 below).

The angular rate sensors and the accelerometers are mounted on the vehicle along the body frame directions $b_1$, $b_2$ and $b_3$, which are the x axes of the vehicle's sprung mass.

The longitudinal acceleration sensor is mounted on the vehicle located at the center of gravity, with its sensing direction along the $b_1$-axis, whose output is denoted as $a_x$. The lateral acceleration sensor is mounted on the car body located at the center of gravity, with its sensing direction along $b_2$-axis, whose output is denoted as $a_y$. The vertical acceleration sensor is mounted on the car body located at the center of gravity, with its sensing direction along $b_3$-axis, whose output is denoted as $a_z$.

The other reference frames used in the following discussion includes the road reference frame, as depicted in FIG. 2. The road reference frame system $r_1 r_2 r_3$ is fixed on the driven road surface at any instant in travel time of the vehicle, where the $r_3$ axis is along the average road normal direction computed from the normal directions of the four-tire/road contact patches.

In the following discussion, the Euler angles of the body frame $b_1 b_2 b_3$ with respect to the road frame $r_1 r_2 r_3$ are denoted as $\theta_{xbr}$, $\theta_{ybr}$ and $\theta_{zbr}$, which are also called the relative Euler angles.

Referring now to FIG. 3, control system 18 is illustrated in further detail having a controller 26. Controller 26 in this case may be a single centralized vehicle controller or a combination of controllers. If many controllers are used they may be coupled together to communicate various information therebetween, and arbitration and prioritization among multiple controllers might also be performed. Preferably, the controller 26 is microprocessor-based.

The controller 26 may be programmed to perform various functions and control various outputs. Controller 26 may also have a memory 27 associated therewith. Memory 27 may be a stand-alone memory or may be incorporated within the controller 26. Memory 27 may store various parameters, thresholds, patterns, tables or maps. For example, a map of how much brake-steer to generate in response to steering wheel rate and vehicle velocity may be stored in memory. Such maps may be calibratable during vehicle development.

The controller 26 is used for receiving information from a number of sensors, which may include speed sensors 20, a yaw rate sensor 28, a lateral acceleration sensor 32, a roll rate sensor 34, a vertical acceleration sensor 35, a longitudinal acceleration sensor 36, a pitch rate sensor 37, and steering angle position sensor 38. Sensors 28-38 may be part of an inertial measurement unit 40 or IMU.

In one embodiment, the sensors 28-37 are located at the center of gravity of the vehicle. Those skilled in the art will recognize that the sensors may also be located on various locations off the center of gravity and mathematically translated equivalently thereto.

Roll rate sensor 34 and pitch rate sensor 37 may be used to sense the vehicle roll and pitch conditions. The roll and pitch conditions of the vehicle might be conducted based on sensing the height of one or more points on the vehicle relative to the road surface. Sensors that may be used to achieve this include a radar-based proximity sensor, a laser-based proximity sensor and a sonar-based proximity sensor.

Roll and pitch conditions of the vehicle may also be sensed based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll and pitch conditions may also be sensed by sensing the force or torque associated with the loading condition of one or more suspension or chassis components including a pressure transducer in an active air suspension, a shock absorber sensor such as a load cell, a strain gauge, the steering system absolute or relative motor load, the steering system assist pressure, a tire laterally force sensor or sensors, a longitudinal tire force sensor, a vertical tire force sensor or a tire sidewall torsion sensor.

The roll and pitch condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor 35, a vehicle longitudinal acceleration sensor 36, lateral or vertical speed sensors including a wheel-based speed sensor, a radar-based speed sensor, a sonar-based speed sensor, a laser-based speed sensor or an optical-based speed sensor.

Lateral acceleration, roll and pitch orientations and velocities may be obtained using a global positioning system (GPS) 41.

The controller 26 may also be coupled to a lidar, radar, or sonar 42. The lidar, radar, or sonar 42 may be used to generate a velocity signal or relative velocity signal of an object. The radar or lidar may also be used to generate a trajectory signal of an object. Likewise, the velocity of the vehicle in various directions may be obtained relative to a stationary object. A lidar, radar, or sonar sensor 42 may be mounted in various positions around the vehicle including the front, sides and/or rear. Multiple sensors 42 may also be employed in multiple locations to provide multiple information from multiple positions of the vehicle. Such signals may also be used in a self parking condition.

Controller 26 may also be coupled to a camera system 83 having cameras 43a-43e. A stereo pair of cameras 43a, 43b may be mounted on the front of the vehicle to detect target objects in front of the vehicle, to measure the object size, range and relative velocity and to classify those objects into appropriate categories. Camera 43c may be mounted on the right side of the vehicle, camera 43d may be mounted on the left side of the vehicle, and camera 43e may be directed rearward of the vehicle. Camera 43e may also include a stereo pair of cameras. All or some of the cameras may be used in a commercial embodiment. Also, a stereo pair of cameras 43a, 43b may be replaced by a single camera (43a or 43b) depending on the roll and pitch conditions measured by the system. Various types of cameras would be evident to those skilled in the art. Various types of cameras such as a CMOS-type camera or a CCD-type camera may be implemented to generate various image signals. As will be further described below, the various image signals may be analyzed to determine the various dynamic conditions of the vehicle.

Controller 26 may also be coupled to an input device 44. Input device 44 may include a keyboard or other push button type device. Input device 44 may be used to enter trailer parameters or indicate to the controller a selection or other inputs.

A reverse aid system 46 having at least one reverse aid sensor 48 may be coupled to controller 26. Reverse aid sensor 48 may be but is not limited to an ultrasonic sensor, a radar sensor, or a combination of the two. Reverse aid sensors 48 are typically located at several locations of the rear of the vehicle such as in the bumper. As will be further described below, the reverse aid system 46 may be used to provide an indication as to the presence of a trailer and may also be used to generate a particular pattern with respect to the trailer to allow the controller to have feedback with respect to the position of the trailer.

A hand wheel (also known as "steering wheel") position sensor 50 may also be coupled to controller 26. Hand wheel position sensor 50 provides controller 26 with a signal corresponding to the relative rotational position of the steering wheel within the vehicle. Various types of sensors include absolute sensors and position sensors using a center find algorithm (relative sensors). Relative sensors may use the centerfind algorithm to determine the position relative to a center position once the position is known. Both types of sensors may provide a steering angle rate signal and/or a steering direction signal. For example, the steering direction may indicate away from or toward a center position or end stop position.

A hand wheel torque sensor 52 may also be coupled to controller 26. Hand wheel torque sensor 52 may be a sensor located within the steering column for direct measurement. The steering torque may also be inferred from data available to the power steering system. The hand wheel torque sensor 52 generates a signal corresponding to the amount of torque placed on the hand wheel (steering wheel within the vehicle).

A mu ($\mu$) sensor 54 may also be coupled to controller 26. Mu sensor 54 may be a direct sensor or, more likely, is a calculated value based on available inputs. Various systems such as a yaw control system for an anti-lock brake system may generate mu. Mu is an indication of the coefficient of friction of the surface on which the vehicle is traveling. The mu sensor 54 may be used to generate a coefficient of friction for the vehicle or the coefficient of friction at more than one contact patch of the tire. Preferably, a mu is determined at each contact patch of each tire.

A throttle sensor 56 may also be coupled to controller 26. Throttle sensor 56 may, for example, be a resistive sensor. Of course, other types of throttle sensors would be evident to those skilled in the art. Throttle sensor 56 generates a signal corresponding to the position of the throttle of the vehicle. The throttle sensor 56 may give an indication as to the driver's intention regarding acceleration. Throttle sensor may also be part of a drive-by-wire type system. A throttle type sensor may also be used in electric vehicles and vehicles with diesel engines to determine the desire acceleration. These sensors may take the form of a pedal sensor.

A vehicle load sensor 58 to sense the amount of weight or payload within the vehicle may also be coupled to controller 26. Vehicle load sensor 58 may be one of various types of sensors including a suspension sensor. For example, one load sensor may be located at each suspension component. Load sensor 58 may, for example, be a pressure sensor in an air suspension. The load sensor 58 may also be a load cell. In any case, the vehicle load sensor 58 generates an electrical signal corresponding to the load on the vehicle. One sensor or preferably one sensor for each corner of the vehicle may be used. The vehicle load may, for example, be the normal load at each corner of the vehicle. By knowing the normal load at each corner of the vehicle, the total amount of loading on the vehicle may be determined.

A suspension height sensor 60 may also be coupled to controller 26. Suspension height sensor 60 may be a suspension height sensor located at each corner of the vehicle. Suspension height sensor 60 may also be part of an air suspension or other type of active suspension. Suspension height sensor 60 generates a height signal corresponding to the extension of the suspension. The suspension height sensor 60 may also be used to determine the vehicle load, normal load, and payload distribution, rather than using vehicle load sensor 58 described above. Suspension height sensor 60 may be one of various types of sensors including a laser, optical sensor, or the like.

A transmission gear selector 62 may also be coupled to controller 26. Transmission gear selector 62 may, for example, comprise a shift lever that has the PRNDL selections corresponding to the park, reverse, neutral, regular drive and low drive positions of the transmission. Also, an electrical signal may be generated in response to the position of the shift lever of a manual transmission.

A mode selector 64 may also be coupled to controller 26. Mode selector 64 may select a driver selectable mode selector such as a manually activated mechanism (e.g., push button or the like) or a voice recognition system. Mode selector 64 may, for example, select a position that corresponds to trailering. Also, mode selector may determine a park position indicating that the vehicle operator intends to park the vehicle. A U-turn position may also be selected. The mode selector may be used to enable or disable the system.

A secondary steering actuator 66 such as a turn signal actuator, an additional stalk or push buttons may also be coupled to controller 26. The secondary steering actuator 66 may also initiate the display of a turn signal indicator on the instrument panel of the vehicle. Secondary steering actuator 66 may be used to steer a trailer of the vehicle as described below. For example, the vehicle or trailer may be directed in a particular direction corresponding to the secondary steering actuator direction.

A display 68 may also be coupled to controller 26. Display 68 displays various types of displays or combinations of displays. Display 68 may display the various conditions of the vehicle such as the inputs from the input device 44, mode selector indicators from mode selector 64, and turn signal actuator 66. Display 68 may be a light on a dash panel or part of a more complex LED or LCD display on the instrument panel of the vehicle. Of course, other locations for the display may include an overhead display or the like. Display 68 may also be used to display the projected position of a trailer relative to the vehicle.

Hand wheel switches 70 may be coupled to the steering or hand wheel. Hand wheel switches 70 may be labeled left and right corresponding to a left and right direction. As will be described below, brake-steer may be initiated in response to the switches 70. Hand wheel switches 70 may also be used to independently control left and right trailer brakes to help maneuverability of the trailer.

Based upon inputs from the sensors and/or cameras, GPS, and lidar or radar, controller 26 may control a safety device 84. Depending on the desired sensitivity of the system and various other factors, not all the sensors 20, 28-66, cameras 43a-43e, lidar or radar 42, or GPS 41 may be used in a commercial embodiment. Safety device 84 is part of a vehicle subsystem control. Safety device 84 may control a passive safety device 86 such as an airbag, a pressure sensor 89, a steering actuator 88, or a braking actuator 90 at one or more of the wheels 12a, 12b, 13a, 13b of the vehicle. Engine intervention 92 may act to reduce engine power to provide a safety function. Also, other vehicle components such as a suspension control 94 may be used to adjust the suspension and provide for various types of control in dynamic conditions such as brake-steer. An anti-roll bar system 96 may be used to prevent rollover. The anti-roll bar system 96 may comprise a front or rear active anti-roll bar, or both. It should also be noted that the systems 88-96 may act alone or in various combinations. Certain systems 88-96 may act to provide a safety function when various dynamic conditions are sensed.

Steering actuator 88 may include the position of the front right wheel actuator, the front left wheel actuator, the rear left wheel actuator, and the right rear wheel actuator. As described above, two or more of the actuators may be simultaneously controlled. For example, in a rack-and-pinion system, the two wheels coupled thereto are simultaneously controlled.

Safety device 84 may also comprise a roll stability control system 102, an anti-lock brake system 104, a yaw stability control system 106, and/or a traction control system 108. The roll stability control system 102, anti-lock brake system 104, yaw stability control system 106, and traction control system 108 may be coupled to brake system 90. Further, these systems may also be coupled to steering actuator 88. Engine intervention 92 may also be coupled to one or more of the devices, particularly the roll stability control system, yaw stability control system, and traction control system. Thus, the steering actuator 88, brake system 90, engine intervention 92, suspension control 94, and anti-roll bar system 96 may be part of one of the dynamic control systems 102-108. As will be further described below, the yaw stability control system 106 may have thresholds that are set by the controller 26 and that may be changed based upon the various conditions of the vehicle such as a trailering condition.

A warning device 112 may also be coupled to controller 26. Warning device 112 may warn of various conditions such as an impending rollover, understeer, oversteer, an approach of an in-path object, or impending trailer interference during a reverse direction. The warnings are provided in time for the driver to take corrective or evasive action. The warning device 112 may be a visual display 114 such as warning lights or an alpha-numeric display such an LCD screen. Display 114 may be integrated with display 68. The warning device 112 may also be an audible display 116 such as a warning buzzer, chime or bell. The warning device 112 may also be a haptic warning such as a vibrating steering wheel. Of course, a combination of audible, visual, and haptic display may be implemented. A blinking light or display may be used to indicate the actual steering angle versus the steered wheel angle. That is, the light may come on solid when the steering is enhanced by the control system and blinks when less than the steering angle is being accomplished such as on a low mu surface.

A level-based system 118 may also be coupled to controller 26. Level-based system 118 uses the pitch level or angle of the vehicle to adjust the system. Level-based system 118 may, for example, be a headlight adjustment system 120 or a suspension leveling system 122. Headlight adjustment system 120 adjusts the beam pattern downward for a loaded vehicle. Suspension leveling system 122 adjusts the suspension at the various corners of the vehicle to maintain the vehicle relatively level to the road. The level-based system 118 may also make an adjustment based on the roll angle of the vehicle.

Figure 4:
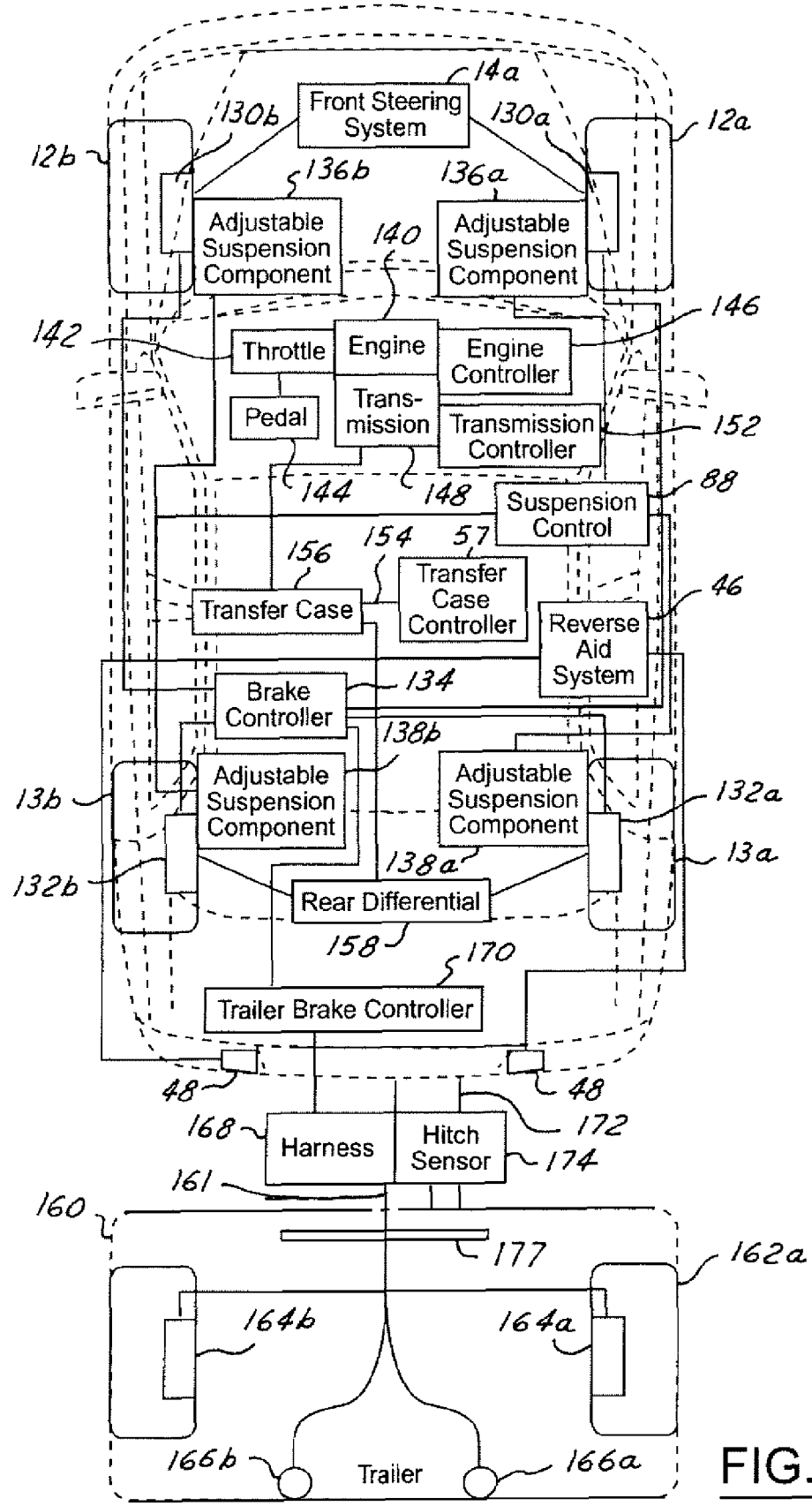
FIG. 4 is a high level block diagrammatic view of systems of the automotive vehicle according to the present invention.

Referring now to FIG. 4, vehicle 10 is illustrated in further detail. As illustrated in FIG. 1, vehicle 10 has wheels 12a, 12b, 13a and 13b. Associated with each wheel is a pair of front brakes 130a and 130b and a pair of rear brakes 132a and 132b. Brakes 130 and 132 may be independently actuatable through a brake controller 134. Brake controller 134 may control the hydraulic system of the vehicle. Of course, electrically actuable brakes may be used in the present invention. Suspension control 88 may be coupled to front adjustable suspension components 136a and 136b, and rear adjustable suspension components 138a and 138b. The adjustable suspension components may be various types including magnetic field responsive fluid or an elastomeric component link or bushing. A magneto-rheological device may be used. The components may be a link such a toe link or other control arms of the vehicle. The adjustability may be incorporated into the mounting of the suspension components such as in the bushings.

Also illustrated in FIG. 4 is front steering system 14a described above with respect to FIG. 1.

Also illustrated is the reverse aid system 46 having a pair of reverse aid sensors 48 as described above.

Vehicle 10 may also have an internal combustion engine 140. Engine 140 may have a throttle device 142 coupled thereto which is actuated by a foot pedal 144. Throttle device 142 may be part of a drive-by-wire system or by a direct mechanical linkage between pedal 144 and throttle device 142. Engine 140 may include an engine controller 146. Engine controller 146 may be an independent controller or part of controller 26 for the vehicle. Engine controller 146 may be used to reduce or increase the engine power. While a conventional internal combustion engine is calculated, the vehicle could also be powered by a diesel engine or an electric engine or the vehicle could be a hybrid vehicle utilizing two or more types of power systems.

A transmission 148 may be coupled to engine 140. Transmission 148 may be an automatic transmission or a manual transmission. A gear selector 150 is used to select the various gears of the transmission 148. Gear selector 150 may be a shift lever used to select park, reverse, neutral and drive positions of an automatic transmission. A transmission controller 152 may also be coupled to transmission 148. Transmission controller 152 may be a separate component or may integrated with engine controller 146 or another controller such as controller 26. Both engine controller 146 and transmission controller 152 may be integrated alone or together with controller 26. The various controllers may be programmed to perform various functions.

The output of the transmission 148 is coupled to a driveline 154. The driveline 154 may be coupled to a transfer case 156 having a transfer case controller 157 and a rear differential 158. In the case of an all-wheel drive vehicle, the transfer case may include a center differential. Transfer case 156 may have a 4×4 mode and a 4×2 mode that is controlled by controller 157. As will be described below, changing to a 4×2 mode from a 4×4 mode may be desirable during brake-steer. The front differential 156 and rear differential 158 may be closed, locking, or open differential. Various types of differentials may be used depending on the desired vehicle performance and use. The differential may be controlled by controller 26. Further the controller 26 may also know and/or control the operating conditions of the vehicle include 4×4 mode, 4×2 mode, the locking condition of each of the differentials and high and low mode of a 4×4.

A trailer 160 may be towed behind vehicle 10. Trailer 160 may include a tongue 161 and trailer wheels 162a and 162b. Of course, various numbers of axles/wheels may be used on a trailer having a right and left wheel or set of wheels. Each trailer wheel 162a, 162b includes a trailer brake 164a and 164b. Trailer 160 may also include other electrical components such as lights 166a and 166b. A harness 168 may be used to couple the electrical components such as the brakes 164a, 164b and lights 166a, 166b to the vehicle 10. More precisely, the harness 168 may be used to couple the trailer to the electrical system of the vehicle. Harness 168 may also couple the trailer 160 to a trailer brake controller 170. Trailer brake controller 170 may be an independent controller or may be integrated within brake controller 134 described above. Preferably, trailer brake controller 170 is capable of controlling brakes 164a or 164b together or independently. The trailer 160 is coupled to the vehicle 10 through a hitch 172 located at the end of tongue 161. The hitch 172 may have a hitch sensor 174 thereon. The hitch sensor 174 is used to determine the position of the trailer relative to the vehicle 10. Various types of hitch sensors such as resistive, inductive, ultrasonic or capacitive type sensors may be used to determine the relative angle of the trailer 160 with respect to the vehicle. Hitch sensor 174 may be used to determine the vehicle load. Other ways to determine the position of the trailer may include cameras located on either the trailer or vehicle or the reverse sensors.

Referring now to FIG. 5, a perspective view of vehicle 10 having an alternative method for determining the relative position of the trailer 160 relative to the vehicle is illustrated. The vehicle is illustrated having a ball 175 that is positioned at or near the rear bumper 176 of the vehicle. In this embodiment, only two reverse aid sensors 48 are illustrated. However, various numbers of reverse aid sensors may be illustrated. Trailer tongue 161 has a locating plate 177 thereon. Locating plate may, for example, have a locating hole 178 aligned with the center of the tongue 161. In addition to or instead of locating hole 178, a locating opening 179 may be positioned on the locating plate. The locating plate 177 is fixedly attached to the trailer or tongue 161 so that the locating hole 178 and/or the locating opening 179 is centered with the tongue. The reverse sensing system detects the position of either the locating hole 178 or locating opening 179. Thus, the relative position of the trailer may be determined using the reverse aid sensors 48. The reverse aid sensors 48 generate signals and locate the position of the locating hole. The display 68 described above in FIG. 3 may generate a screen display or audible display based on the position of the locating plate and thus the tongue 161 relative to the vehicle. Thus, while backing the vehicle 10 to attached the trailer thereto, the ball 175 may be more easily aligned with the trailer hitch 172. To summarize, a method for aligning a vehicle includes driving the vehicle in a reverse direction and sensing the position of a locating plate or a locating guide such as the hole 178 or opening 179. An indicator may be generated in the vehicle corresponding to the position of the trailer hitch or tongue relative to the vehicle. The vehicle could be automatically brake-steered or braked to cause alignment of the ball on the vehicle to the hitch on the trailer.

Yet another method of determining the alignment of the trailer with respect to the vehicle is as follows. The ball hitch 175 has a shallow square hole H1 at its top into which fits a mating spring-loaded rod and corresponding spring S1 on the trailer coupler 172. (The spring-loading prevents damage to the rod and hole if the hitch is coupled with the rod and hole out of alignment.) The rod is connected to a potentiometer P1 or optical rotation sensor affixed to the trailer coupler 172. When the vehicle turns relative to the trailer, the potentiometer or optical rotation sensor is rotated, providing a measurement of the relative vehicle-trailer angle.

Referring now to FIG. 6, a Hotchkiss rear suspension 180 is illustrated formed according to the present invention. Hotchkiss rear suspension 180 may include the adjustable suspension component 138a and/or 138b as described above. Both the front and the rear mounts may be formed using the adjustable suspension component 138a or 138b. In a Hotchkiss rear suspension, lateral forces are applied at the front spring eye 181 and the rear shackle attachment point 182. A front bushing 184 and a rear bushing 186 are used in the coupling. Leaf springs 188 extend between the front spring eye and the rear shackle 182. The front spring eye and the rear shackle 182 are coupled to the frame 190 of the vehicle. Bushings 184 and 186 are compliant bushings coupled to suspension control 88. By varying the signal from the suspension control to the bushings, the bushings are adjustable. By adjusting the compliance of bushings, the amount of movement or articulation at the rear wheels may be varied under lateral/longitudinal loading. That is, both wheels on each side of the axle may be articulated relative to a vertical axis when in a turning mode. By controlling the movement of the suspension through the bushings, the radius of curvature of the vehicle may also be reduced.

Another application of the invention is to utilize adjustable bushing in 138a and 138b. Such a device may be hydraulically or magneto-rheologically locked so that its attitude can be locked into certain positions. When such a device, located at 138a and 138b, is unlocked and its attitude is compliant to longitudinal loads, a braking/traction force can induce an attitude change of the Hotchkiss suspension and its corresponding wheels. Upon favorable changes in place, the attitude of Hotchkiss suspension and wheels is then locked by the adjustable bushings 138a and 138b (either hydraulically or magneto-rheologically). Effectively, the Hotchkiss suspension and wheels are steered through both the braking/traction force and the locking/unlocking of Bushings 138a and 138b. In other words, the Hotchkiss suspension and wheels serve as a semi-active steering system where the "semi-active" refers to the elimination of the need of a (usually costly) steering actuator in the said steering mechanism. The steering actuation as described above, is actually done by regulating the disturbances (i.e. longitudinal forces) coming into the steering system.

Figure 7:
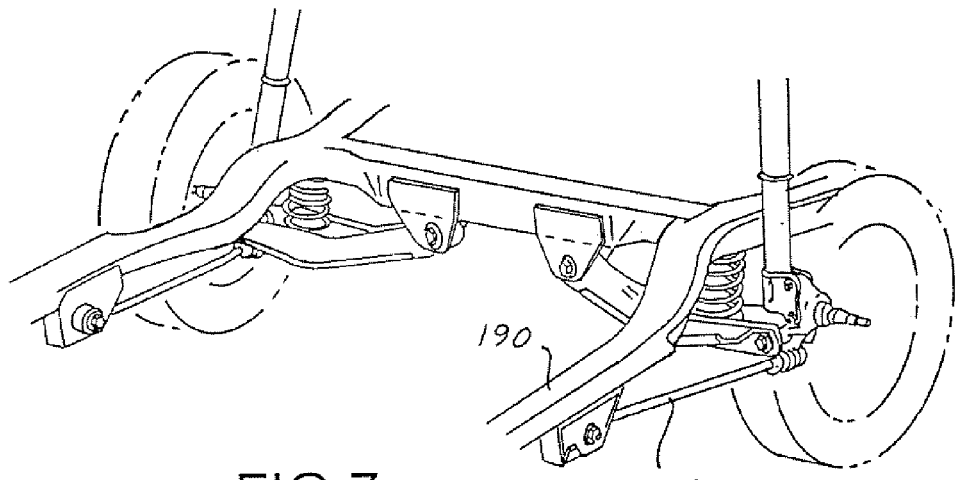
FIG. 7 is a perspective view of an independent suspension.

Referring now to FIG. 7, a four link suspension is illustrated relative to vehicle frame 190. The four link suspension includes a toe link 194.

Figure 8:
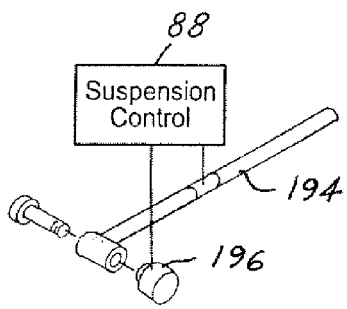
FIG. 8 is an exploded view of a tow link of an independent suspension.

Referring now to FIG. 8, toe link 194 is illustrated in further detail. Toe link 194 helps to control oversteer conditions that would be present with some rear independent suspensions. Because the suspension is slightly compliant, the toe link forces the outside rear wheel to toe-in slightly in a turn. Side loads in a turn presented at the toe link cause the toe link to articulate the lower control arm and toe in the outside wheel. As is illustrated, a bushing 196 is used to couple the toe link 194 to the body/frame 190. In a similar manner to that described with respect to FIG. 6, the bushing 196 may be electrically controlled. By electrically controlling the bushing, the bushing may be made more or less compliant. In the present application, it may be desirable to make the bushing more compliant during a turn so that more articulated wheel movement is obtained. Also, the toe link may be adjustable much like a mini-shock absorber. Such a device may be hydraulically locked or magneto-rheological.

Another application of the invention is to utilize adjustable toe link 194. Such a device may be hydraulically or magneto-rheologically locked so that its length can be locked into certain positions. When the adjustable toe link is unlocked, its length can be adjusted through braking/traction forces and the suspension geometry. Upon favorable length is achieved, the adjustable toe link is then locked and the corresponding wheel is steered to a new position due to the changed length of toe link. Effectively, the adjustable toe links are steering linkages similar to tie-rods while the steering actuation is performed through the braking/traction forces and the suspension geometry. In other words, the adjustable toe links serve as a semi-active steering system where the "semi-active" refers to the elimination of the need of a (usually costly) steering actuator in the said steering mechanism. The steering actuation as described above, is actually done by regulating the disturbances (i.e. longitudinal forces) coming into the steering system.

Figure 9:
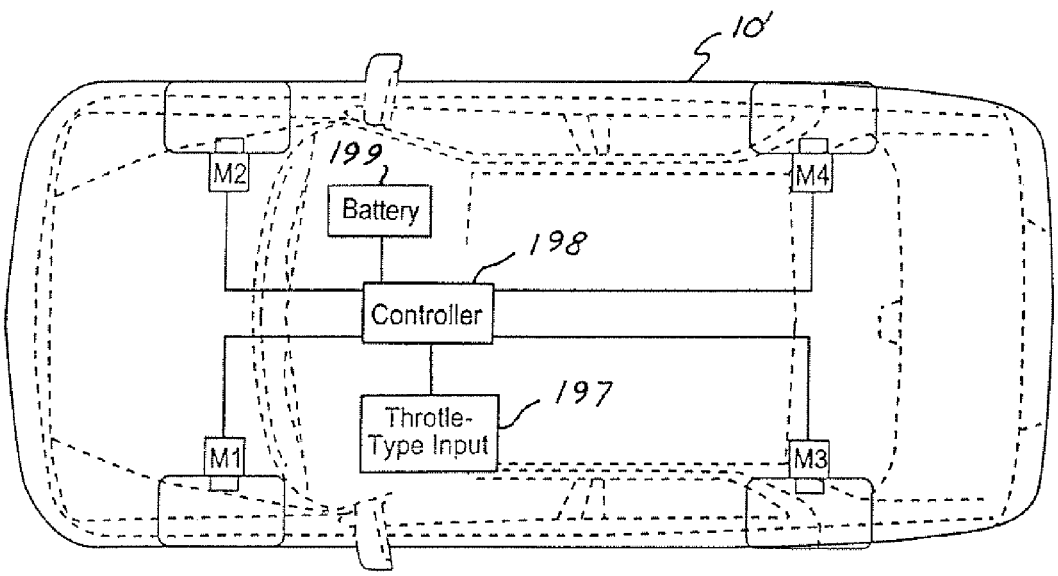
FIG. 9 is a simplified view of an electric vehicle that may use brake-steer according to the present invention.

Referring now to FIG. 9, an alternative vehicle 10' is illustrated. Vehicle 10' is an electric vehicle. The electric vehicle includes electric motors $M_1$, $M_2$, $M_3$ and $M_4$. A throttle type input 197 is coupled to controller 198. Based on the throttle type input that generates a throttle type signal similar to that of an internal combustion engine, controller 198 controls the motors $M_1$-$M_4$. The throttle type input 197 may for example, be a resistive-type pedal sensor or joystick. The controller 198 is capable of independently controlling the torques of the individual motors. Thus, for example, a small torque may be provided at one wheel while a large torque is provided at the other wheel. Similarly, a negative torque may be provided at each of the wheels. That is, the motors may also generate a braking effect on the various wheels. Thus, to provide brake-steer, a differential torque, that is one large torque and one small torque, may be provided on opposite wheels to obtain a brake steering effect. The motors may be operated using various batteries 199 as will be evident to those skilled in the art.

Figure 10:
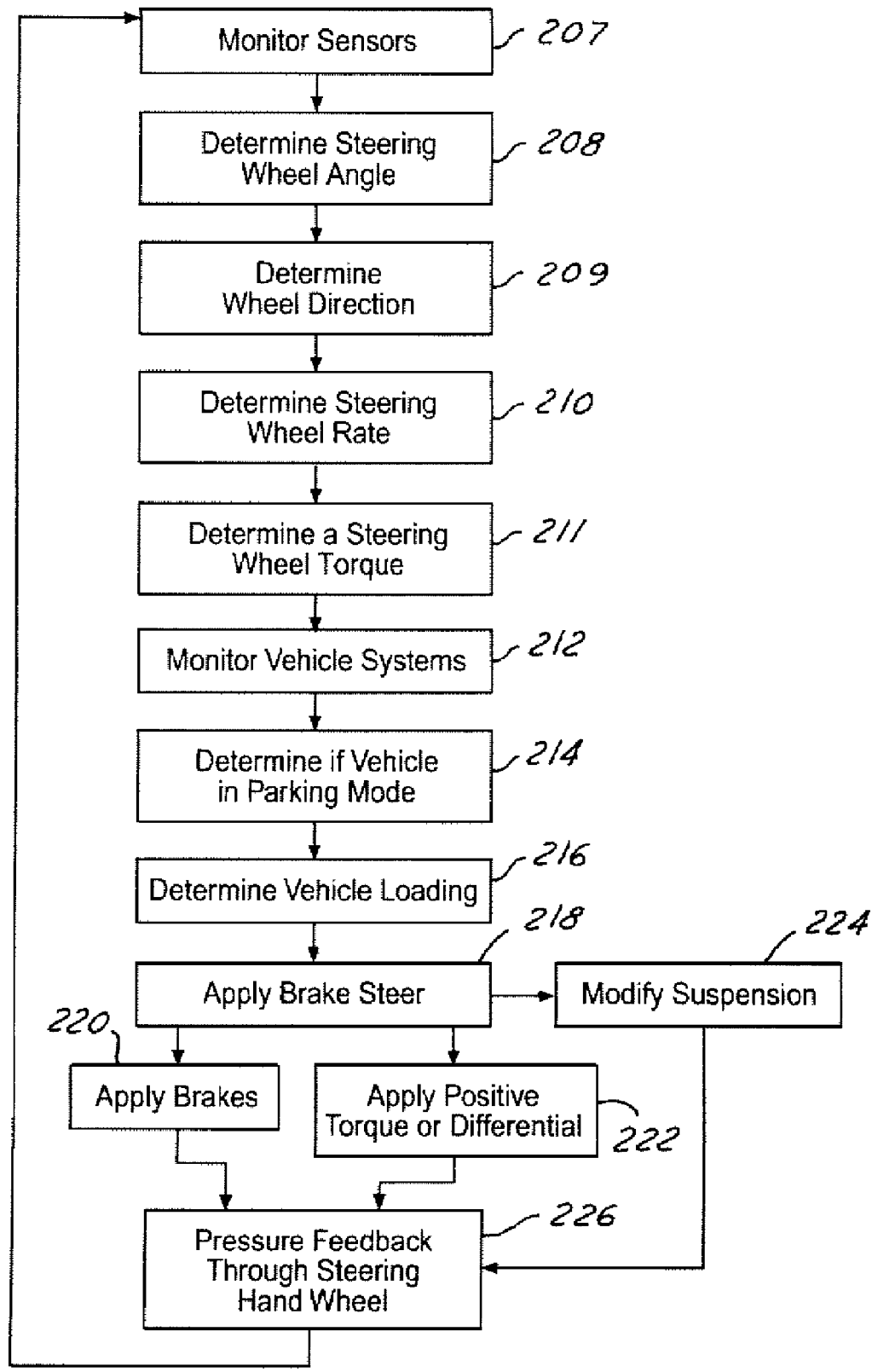
FIG. 10 is a flow chart of a first embodiment of the present invention.

Referring now to FIG. 10, one method of operating the control system is illustrated. In step 207 the various sensors of the system are monitored.

Monitoring the sensors 207 may include among other things, determining a steering wheel angle in step 208, determining a steering wheel direction in step 209, determining a steering wheel turn rate in step 210, and determining a steering wheel torque in step 211.

In step 212, the outputs of various vehicle systems are also monitored. Step 212 may also monitor the anti-lock braking system so that the wheels or wheel on which braking forces apply do not lock up. Thus, by monitoring the wheel speeds, the wheels can be prevented from locking up and thus preventing tire wear at the particular wheel. The traction control system, yaw control system and/or rollover control system may also be monitored.

In step 214, whether the vehicle is in a parking mode is determined. The parking mode may be determined by using various combinations of sensors such as the steering wheel angle sensor, the wheel speed sensor, the wheel speed direction, a combination of the wheel speed sensor and the steering angle sensor, a driver actuated switch, the vehicle velocity, or a switch on the steering system (which may include a pressure relief switch or a limit switch). Another way in which to determine parking is using a map stored in the controller memory 27 which correlates steering wheel rate and vehicle velocity to a park or no-park condition. This type of map may be developed specifically for each vehicle during vehicle development to correlate vehicle speed, steering wheel rate and a parking/non-parking condition.

Right before the vehicle gets into parking mode, the vehicle is likely to be throttled. The vehicle may also be coasted in minimum speed, lightly braked if the driver is driving the vehicle in low speed. The vehicle may be in or entering parking mode if the suspension height sensor detects that the vehicle drives over speed bumps, if the vision sensor detects multiple still vehicles, if the throttle is reduced, if the driver brakes the vehicle from time to time, etc.

In the parking mode, if the steering wheel input is small, the vehicle might be in a straight line parking condition. If the driver commands the steering wheel excessively in one direction, the control system may determine that the vehicle needs turning assist in the parking.

In step 216, vehicle normal force at each of the wheels and the static loading of the vehicle may be adjusted. This step is an optional step for applying brake-steer. The suspension controls are used to adjust normal forces by either open-loop modifying the normal forces of individual corners during brake-steering or closed-loop regulate the normal forces by feeding back the estimated normal forces. For example, the controlled suspensions are adjusted so as to generate larger normal forces at braking/driving wheels than the other wheels during brake-steer applications. The normal forces application can be applied diagonally so that the vehicle attitude is not effected. Another type of suspension controls does not independently adjust the normal forces of individual corners but adjusts the weight distribution and/or weight transfer. This normal force distribution helps improve the neutral-steer/over-steer characteristics of the vehicle and therefore helps improve the turning radius of the vehicle at higher speeds. Total vehicle loading or the normal load at each wheel may be determined. The suspension control and brake-steer control are also adaptively adjusted based on the vehicle loading condition.

In step 218, brake-steer is applied to the vehicle. Step 218 may generate a steering enhance signal or other control signal based upon the sensing of the desirability for brake-steer. For example, when the driver selects a driver selectable mode, a steering enhance signal may be desired if the vehicle is to be turned sharply. Thus, the steering enhance signal may be used to reduce the turning radius of the vehicle. As mentioned above, brake-steer may take the form of applying brakes as in step 220, applying a positive torque in addition to applying brakes in step 222, or applying a differential torque. The differential torque may be performed by providing one wheel with a greater positive torque than a second wheel. This would be particularly useful in the electric vehicle 10' described above. The transfer case mode or differentials may also be changed in a 4×4 vehicle from a 4×4 mode to a 4×2 mode to increase control of the brake-steer. Proportioning brake-steer between front and rear wheels may be performed by proportioning brakes between the front and rear wheels. It should be also noted that applying brake-steer may be performed as a function of the steering wheel or hand wheel torque as measured by the torque sensor 52. For example, more steering wheel torque may correspond to a greater amount of brake-steer being applied. The torque applied in step 222 may also be applied as a function of the traction control system. That is, the combination of steps 212 and step 222 may monitor the traction control system to provide the proper amount of torque to the system to provide torque and to prevent wheel slip. That is, on a split mu surface as detected by the traction control system or the mu sensor, a different amount of torque may be required to be provided based on the coefficient of friction of the surface on which the particular wheel is on to prevent slip. In any event, the amount of torque to each wheel may thus be regulated.

Brake-steer may override the driver's braking request if the vehicle velocity is already under a certain threshold, or the vision or camera sensor indicates that there is no danger of an obstacle. If the vehicle speed is higher than another threshold, the brake-steer would be used to generate differential brake in addition to the driver's braking.

Brake-steer might be overridden if the driver is requesting throttle or braking beyond a certain threshold. In this case, the driver most likely wants to cease parking.

As mentioned above, it may be desirable to apply brakes to one wheel of the vehicle while applying a positive torque to the other wheel. This prevents the vehicle from stopping rather than continuing in a parking condition. By applying torque to the opposite wheel the turning radius of the vehicle is also reduced. Brake-steer may also be performed based on a calculation of the wheel speeds from each of the four wheels. A desired wheel speed is calculated for the first wheel based upon the second wheel speed signal, the third wheel speed signal and the possible fourth wheel speed signal. By calculating the desired first wheel speed signal, braking and/or differential torquing may be applied to the first wheel so that brake-steer is applied to the vehicle. Thus, by controlling the wheel speed, the turning radius of the vehicle may be reduced. In step 224, the normal load at selective wheel or wheels might be adjusted through suspension control or suspension modification. This may be done together with applying brake-steer in steps 220 or 222. By modifying the normal load of the suspension in step 224, the turning radius of the vehicle may be reduced further than brake-steer alone. For example, more normal load may be applied to one corner of the vehicle by raising and lowering the active suspension components. By placing more normal load on a wheel that is braking, the turning radius may be further reduced than that from brake-steer alone.

As mentioned above, the vehicle loading (total static loading or the low frequency portion of the sum of the normal forces at each wheel) may be a factor in the amount of brake-steer to apply. For example, more brake-steer may need to be applied with a fully loaded (high payload) vehicle. Also, the amount of brake-steer may be modified based on the position of the load, for example, if the vehicle has all the loading around the axle intended for brake-steer applications, the required brake pressure for brake-steer may be reduced since the effective yaw moment is amplified. Loading and loading location detection may be determined directly using various suspension sensors or indirectly using calculations performed by other systems such as a yaw control and roll stability control system.

Throttle information may also be used in determining the amount of brake-steer to apply. For example, throttle information may be used to provide a driving torque request, load estimation or the driver's intention. Braking input may be used to override parking mode so that all the brakes are applied to stop the vehicle.

Suspension modifications may also take the form of actively modifying suspension components such as those shown in FIGS. 6-8. A suspension control signal may be generated by the controller to change the characteristics of a particular wheel by articulating the wheel based on the particular vehicle direction so that brake-steer may further enhance the turning radius of the vehicle. One example above is a compliant component of the Hotchkiss suspension. Another example is an adjustable toe link in an independent suspension.

After steps 220, 222, and 224, pressure/torque feedback may be provided to the vehicle operator through the (hand) steering wheel in step 226. It should be noted that the amount of brake-steer may be coordinated with the amount of steering or steering wheel angle (of the hand wheel) provided by the vehicle operator. For example, up to a predetermined threshold, no brake-steer may be provided and after a predetermined threshold, a predetermined amount of brake-steer may be applied.

Another way in which steering feedback may be applied is that when the front steering wheel 14a reaches travel stops, an additional amount of hand wheel steering wheel angle or torque may be used to control the magnitude of brake-steer. Reaching stops may be determined by pressure or limit switches. Thus, after a predetermined hand wheel angle corresponding to the steering system travel stops, an amount of hand wheel torque may correspond directly to an amount of brake-steer applied to the vehicle. The amount of brake-steer on the vehicle may be reduced or increased based upon a combination of differential torque and/or the amount of braking applied to one or more wheels. Further, the amount of brake-steer may also be changed based upon a compliant suspension component or changing the normal load of the suspension.

Figure 11:
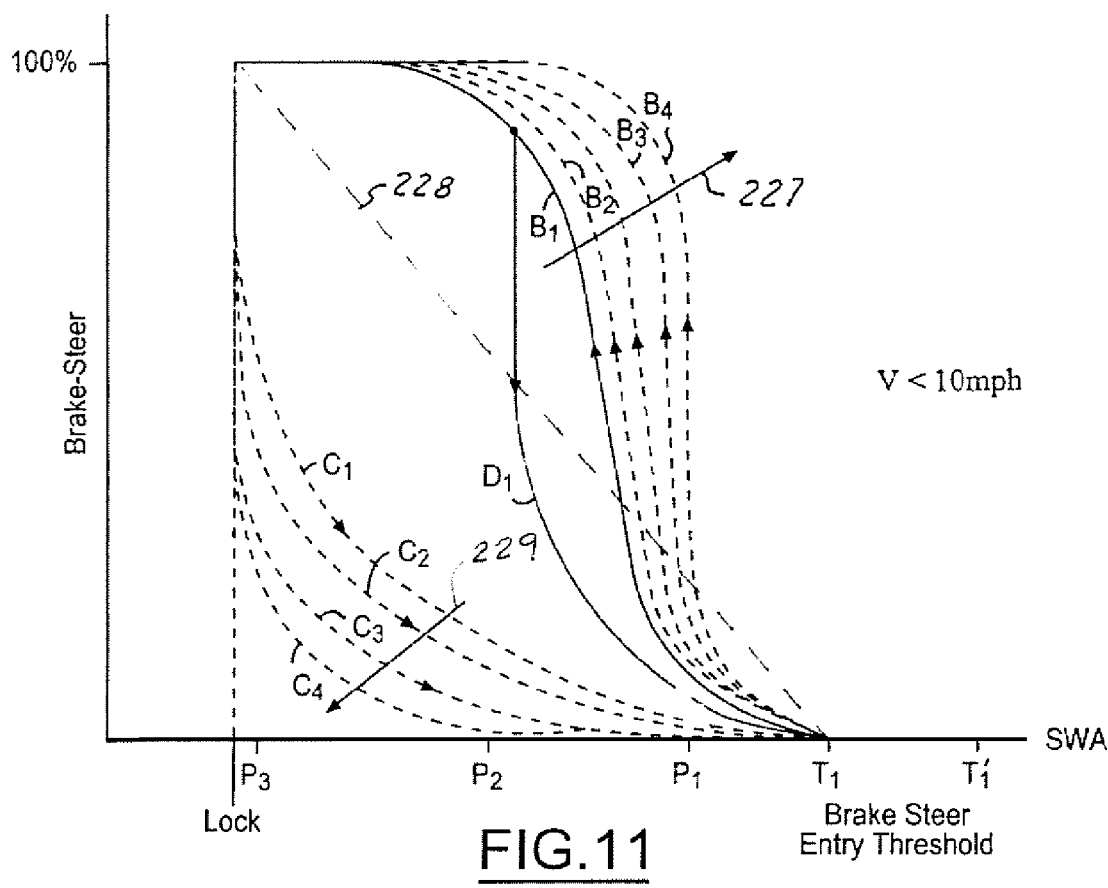
FIG. 11 is a plot of various boost curves relative to an amount of brake steering wheel angle dependent upon steering wheel rate or torque.

Referring now to FIG. 11, a plot of various boost curves based upon SWA rate versus brake steer is illustrated. In this example, the steering wheel angle (SWA) is increasing toward the left of the plot. As illustrated, the boost curves may be non-linear. Also, the boost curve may be valid for vehicle velocities below a velocity threshold such as 10 miles per hour. In FIG. 11, the steering wheel angle starts from the right side of the plot and increases leftward. As the steering wheel angle increases and reaches the brake steer entry threshold $T_1$, brake-steering is initiated. During the period from the brake-steering entry threshold $T_1$ to $P_1$, the brake-steer gradually increases compared to that from the period from $P_1$ to period $P_2$. The gradual increase is provided to provide a smooth transition in the entry of brake-steer. From the period $P_1$ to period $P_2$ a larger slope and thus more aggressive brake-steer is provided to more aggressively turn the vehicle. From the period $P_1$ to "Lock" the slope of the brake boost curve is reduced. As illustrated, four boost curves $B_1$, $B_2$, $B_3$ and $B_4$ are illustrated. In the application of brake-steer one of the boost curves are followed unless the steering angle rate or steering torque increases or decreases described below. The determination of the boost curves may be based on the steering wheel angle rate or the amount of torque applied to the steering wheel. Thus, if the rate of turning of the steering wheel angle is greater, curve $B_2$, $B_3$ or $B_4$ may be chosen. The amount of increasing SWA rate or torque is illustrated by arrow 227. Thus, as the torque or steering wheel rate increases, the slope, particularly in the area between periods $P_1$ and $P_2$, may be increased to more aggressively apply brake-steer to the vehicle. A linear plot of brake-steer is illustrated in dotted lines between brake-steer entry threshold $T_1$ and Lock. As can be seen, the boost curves $B_1$-$B_4$ are more aggressive than the linear plot and thus provide more brake-steer earlier in the turn.

Preferably, a second set of boost curves is used when brake-steer is no longer desired. That is, when the vehicle operator moves the steering wheel angle in the direction toward center as opposed to away from center in boost curves $B_1$-$B_4$, one of boost curves $C_1$-$C_4$ are followed. As in the case above, the various boost curves are chosen based upon the steering wheel angle rate or the steering wheel torque. More aggressive steering wheel angle rate or steering wheel angle torque moves the boost curves in the direction of arrow 229. Thus, at a lower SWA rate or steering wheel torque, boost curve $C_1$ may be followed. Boost curve $C_4$ may be followed upon the application of a high SWA rate or high steering wheel angle torque. In the period between Lock and period $P_3$, a high negative slope is applied to quickly exit brake-steer when brake-steer is no longer desired. Thus, the region between Lock and $P_3$ has an aggressive negative slope whereas the region between $P_3$ and brake entry threshold has a non-linear curving characteristic.

Boost curve $D_1$ is provided to illustrate that when reaching the Lock position is not reached, a non-linear boost curve is followed in the reverse direction. Thus, the boost curve $D_1$ starts on curve $B_1$ between period $P_1$ and $P_2$. The curve has a first portion that has an aggressive negative slope that quickly removes brake-steer when the steering wheel angle travels in the direction toward center and tapers more positively as brake-steer entry threshold $T_1$ is approached.

Figure 12:
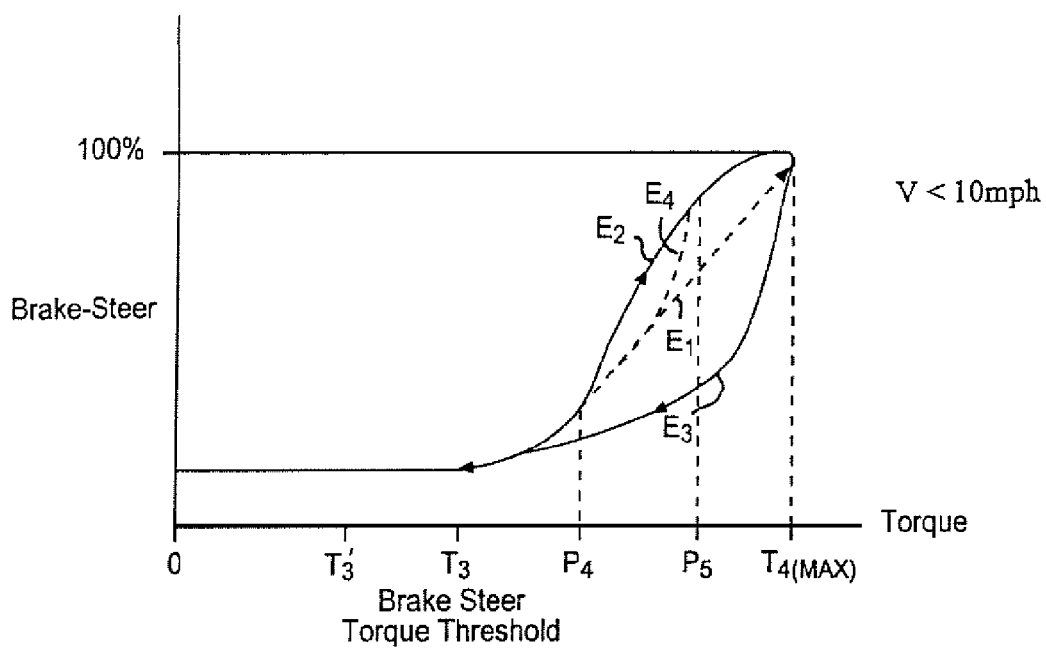
FIG. 12 is a plot of various boost curves relative to an amount of torque.

Referring now to FIG. 12, the amount of brake-steer may be dependent upon an amount of torque alone. That is, as the amount of torque increases, the amount of brake-steer may not increase until a brake-steer threshold is achieved. Thus, an additional amount of torque after $T_3$ may increase the amount of brake-steer. For example, a linear function may be provided between brake-steer torque threshold $T_3$ and a maximum torque threshold $T_4$. Further, a boost curve similar to that shown in FIG. 11 may be used. That is, a non-linear curve $E_2$ may be provided in a forward direction that provides more aggressive application of brake-steer. Thus, between the brake-steer torque threshold $T_3$ and $P_4$ a gradual increase in the amount of brake-steer may be provided. Between periods $P_4$ and $P_5$ an aggressive brake-steer may be provided whereas in the period between $P_5$ and the maximum torque threshold $T_4$ a lower or more gradual amount of brake-steer may be provided. Upon reaching the maximum torque, when the vehicle torque is reduced, a second boost curve $E_3$ may be provided to quickly reduce the amount of brake-steer between period $T_4$ and $P_5$ and gradually reduce the amount of brake-steer between period $P_5$ and brake-steer torque threshold $T_3$. Boost curve $E_4$ illustrates that if the amount of torque does not reach the maximum torque threshold $T_4$, a boost curve similar to that of $E_3$ may be followed from any point on the plot $E_2$. Thus, the plots $E_2$ and $E_3$ are dependent upon the direction of the torque. It should be noted that in FIGS. 11 and 12, the boost curves may be stored in a map in the memory 27 of FIG. 4.

Figure 13:
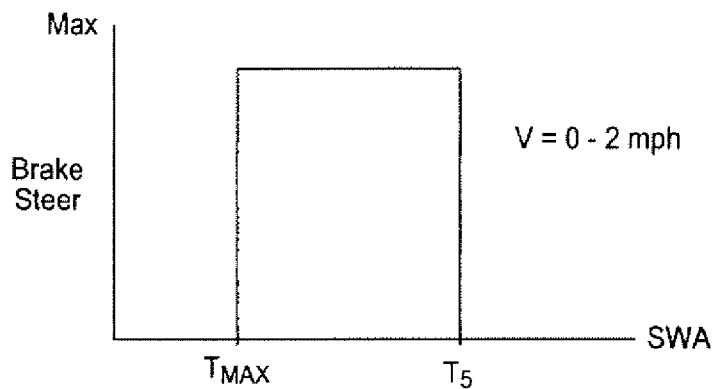
FIG. 13 is a plot of a boost curve used from a vehicle V=0 to a low velocity threshold.

FIG. 13 illustrates a low velocity scenario. If the vehicle velocity is zero and increases to a low velocity such as below two miles per hour, and the steering wheel angle is moved between a threshold $T_5$ and $T_{max}$, this indicates that the vehicle operator may intend to brake-steer the vehicle immediately from a parked position signaling a tight turn. For example, this may signal a parking situation. Thus, when the vehicle is not moving, a maximum brake-steer may be immediately applied. This brake-steer is applied fully since a jump in brake-steer will not be perceived when the vehicle is not moving. Thus, as the vehicle starts to slowly move after being at zero velocity, maximum brake-steer is applied to provide a maximum reduction in the steering radius of the vehicle.

Once the vehicle moves above a low vehicle velocity such as two miles per hour, the boost curves of FIGS. 11 and 12 may be used. This condition may also be dependent on other factors such as a change of position of the shift lever, for example, from park to reverse.

Figure 14:
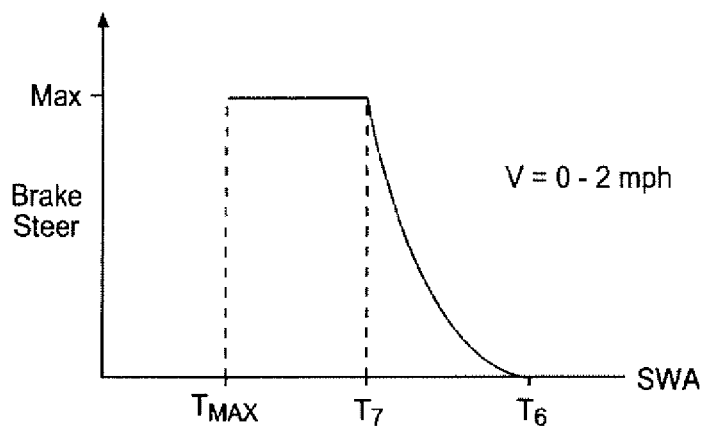
FIG. 14 is a second embodiment plot of a boost curve used from V=0 to a low velocity threshold.

Referring now to FIG. 14, another plot illustrating a boost curve at V=0 to a very low velocity threshold such as two miles per hour is illustrated. In this example, as the steering wheel angle increases between threshold $T_6$ and $T_7$, a gradual curve is applied but aggressive brake-steer is applied when the plot reaches a maximum brake-steer between periods $T_7$ and $T_{max}$. Of course, FIGS. 13 and 14 may also apply to a high steering wheel torque applied to the steering wheel. If the steering wheel torque is applied above a threshold rate and the vehicle velocity is zero, when the vehicle starts to move rapid or maximum brake-steer may be applied.

Figure 15:
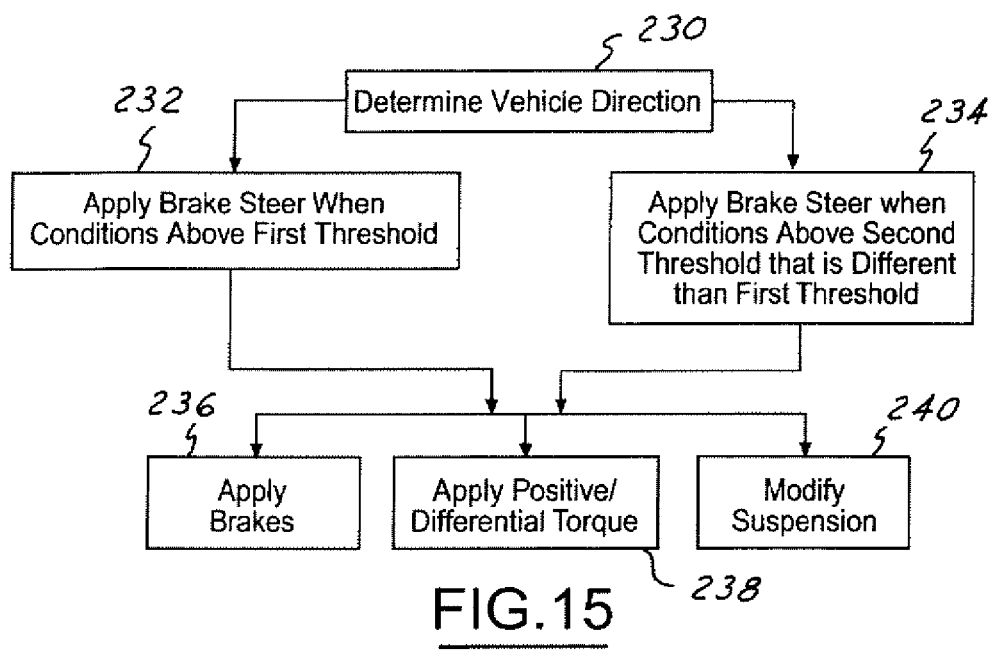
FIG. 15 is a flow chart illustrating a method of operating a second embodiment of the present invention.

Referring now to FIGS. 11 and 15, the system may also apply brake-steer in a forward or a reverse vehicle direction with differing thresholds to provide a different amount of brake-steer. In step 230, it is determined whether the vehicle is driven in a forward or reverse direction. The reverse direction of the vehicle may be determined in several ways. One way in which the reverse direction may be obtained is determining a direction from a transmission shift lever. The shift lever may generate a reverse signal in a reverse position. A push button may also be generated in a reverse direction. The reverse direction may also be obtained from other sources such as a transmission controller or a wheel speed sensor.

In step 232, brake-steer is applied when predetermined conditions are above a first threshold, for example, $T_1$ of FIG. 11 or $T_3$ of FIG. 12. When it is determined that the vehicle is in a reverse direction, in step 234, brake-steer conditions are applied when the vehicle is above a second threshold $T_1$ "(FIG. 11) that may be different than the first threshold. The second threshold $T_1$" may be less than the first threshold. That is, the brake-steer may be applied earlier in reverse to bring about more benefits earlier than that of the forward position. Thus, brake-steer would be more easily or readily applied in a reverse direction. For example, the brake-steer may be applied starting at a higher speed in the reverse condition than the forward condition. Also, in the reverse condition a lower steering wheel angle or steering wheel torque may be used to actuate the brake-steer condition as illustrated by threshold $T_1$ "of FIG. 11. The whole boost curve plot may thus be shifted to the right. Thus, the second threshold may sensitize the system to apply brake-steer earlier. As illustrated in FIG. 12, a lower torque threshold $T_3$" may be used to enter into brake-steer sooner. Also, brake-steer may be applied to different wheels from that in the forward direction. In the forward direction, brake-steer may be applied to one of the rear wheels, while in the reverse direction brake-steer may be applied to one of the front wheels. Brakes are applied in step 236. In step 238, a positive torque or differential torque may be applied to one or more of the wheels. By applying a positive or differential torque to the wheels, brake-steer and/or brake-steer assistance may be obtained. As in the case of brakes, positive or differential torque may be applied to wheels opposite to those applied in the forward direction.

In step 240, suspension modifications may be performed alone or simultaneously with applying brakes or applying positive differential torque in step 238 as described above in FIG. 10.

In steps 236, 238, 240, the amount of brake-steer may be proportioned in response to a transfer case mode. That is, the transfer case of the vehicle may allow the amount of brake-steer to be proportioned between the front and rear wheel. Further, the transfer case may also change modes (e.g., from 4×4 to 4×2 mode) during brake-steer. The system may then return to its original mode (e.g., 4×2 to 4×4 mode) automatically. The front, center and/or rear differentials may be switched from locked to unlocked or vice versa. The amount of proportioning may be varied depending on the vehicle driving conditions.

Figure 16:
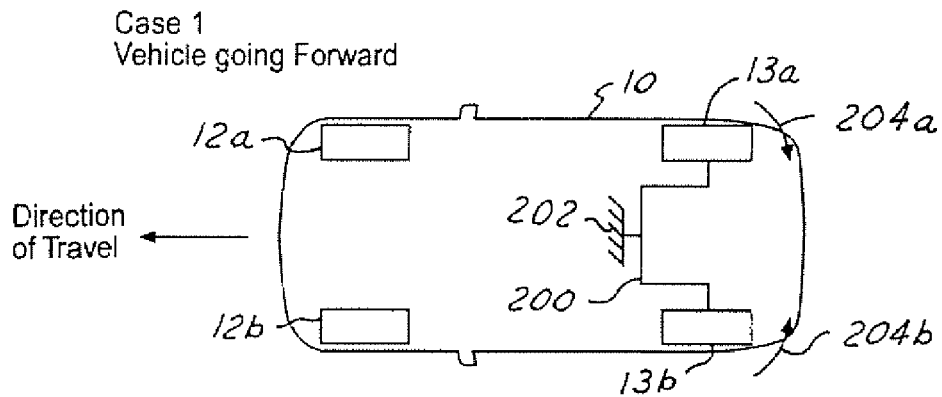
FIG. 16 is a simplified top view of a vehicle having a controllable suspension illustrating brake-steer in a forward direction.

Referring now to FIG. 16, the wheels may be articulated in various directions based upon the direction and/or surface mu. A simplified version of a vehicle illustrates the wheels 12a, 12b, 13a, and 13b. A compliant mount 200 having a locking mechanism 202 is illustrated. The compliant mount is mounted between rear wheels 13a and 13b. Locking mechanism 202 may, for example, be a solenoid locking mechanism. The solenoid locking mechanism may allow one wheel to articulate relative to the other wheel based upon the direction. For example, when traveling in a forward direction and the vehicle is desired to turn to the left, the rear wheel 13a may be articulated in the direction illustrated by arrow 204a. When the vehicle is desired to turn in a right direction, locking mechanism 202 may allow wheel 13b to articulate in the direction illustrated by arrow 204b.

Figure 17:
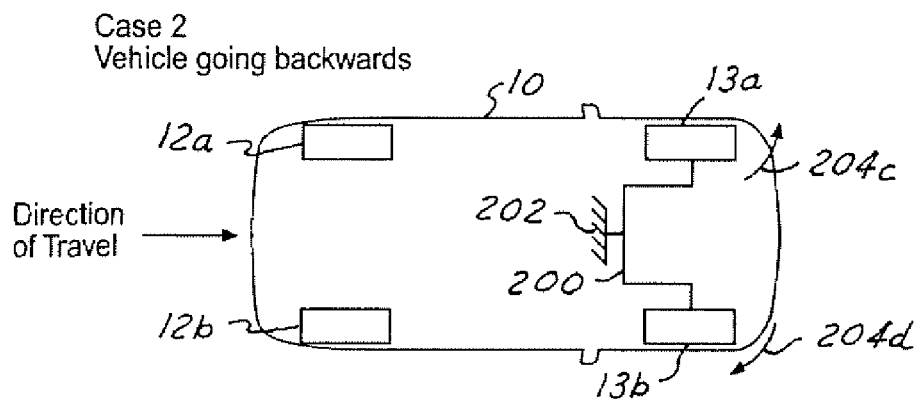
FIG. 17 is a simplified top view of a vehicle having a controllable suspension illustrating brake-steer in a reverse direction.

Referring now to FIG. 17, when the vehicle is turning in a rearward direction, the desired vehicle direction may be opposite of that shown in FIG. 16. For example, in a rearward direction to turn the rear of the vehicle toward the right side of the vehicle (relative to the vehicle traveling in a forward direction), the rear wheel may be articulated outward in the direction shown by arrow 204c. In the rearward direction when the vehicle is to be driven to the left in a rearward direction (relative to the forward direction of the vehicle), the wheel 13b is articulated in the direction shown by arrow 204d.

Figure 18:
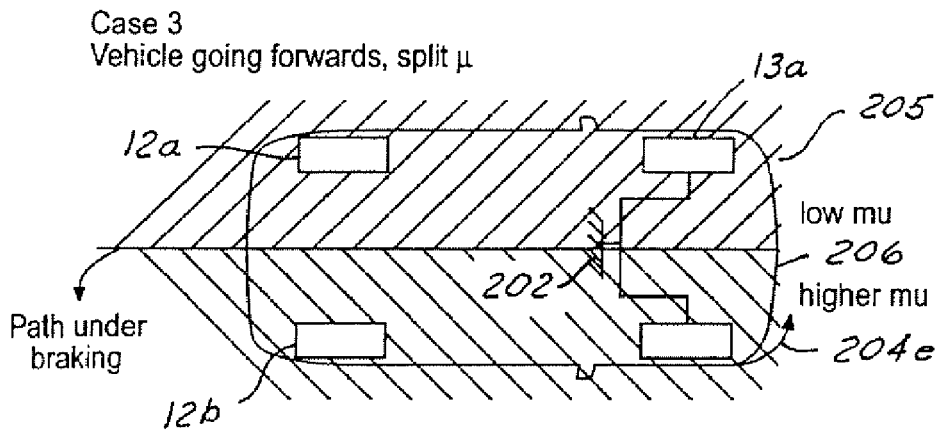
FIG. 18 is a simplified top view of a vehicle having a controllable suspension illustrating brake-steer on a split mu surface.

Referring now to FIG. 18, on a split mu surface having a low mu surface 205 and a surface 206 having a mu higher than that of 205, if the vehicle is traveling in a forward direction and is desired to turn in a left direction, wheel 13b is articulated in the direction shown by arrow 204e. The directions illustrated by arrows 204a-204e reduce the turning radius of the vehicle.

Figure 19:
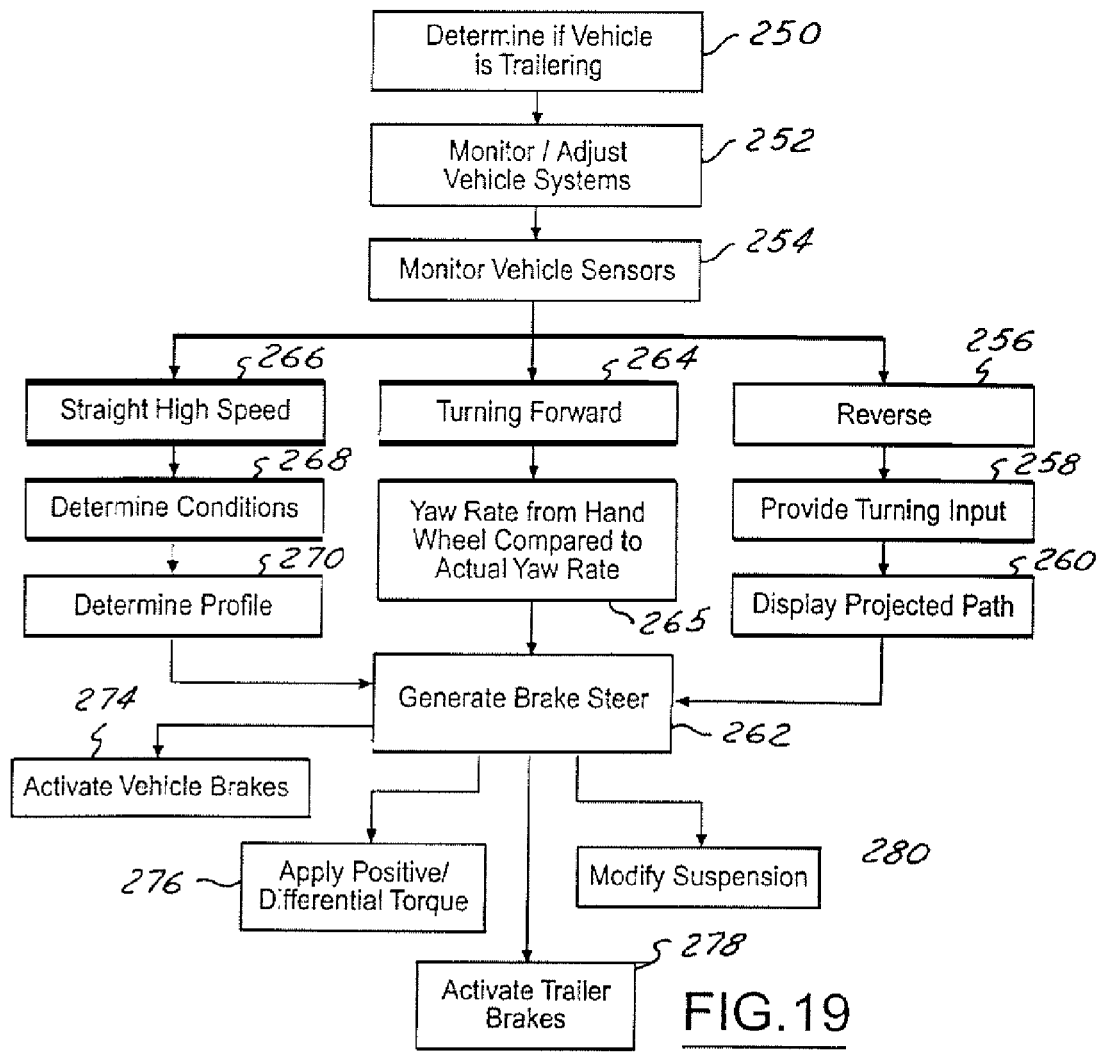
FIG. 19 is a block diagrammatic view of a third embodiment of the present invention.
Figure 20:
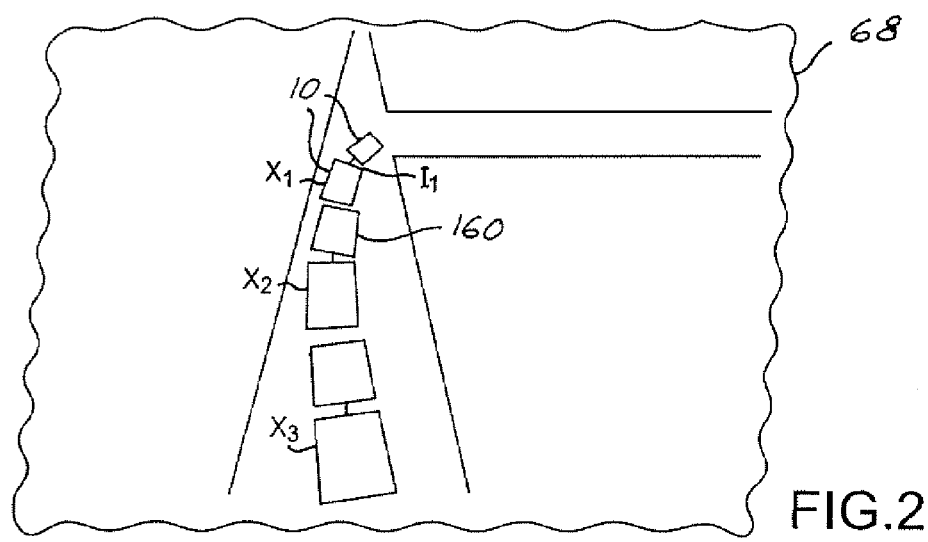
FIG. 20 is a plot of a screen display of a trailer and vehicle with predicted positions.

Referring now to FIGS. 19 and 20, the present invention may also be used to enhance the trailerability of a vehicle. In step 250, it is determined if the vehicle is trailering. The presence of a trailer may be determined in several manners, including, for example, the hitch sensor, the reverse aid system, an ultrasonic sensor (which may be one of the reverse aid system sensors), monitoring the current through a harness, a push button, a camera, or algorithm-based loading or loading detection through existing vehicle dynamics sensors. The algorithm-based vehicle loading and loading location determination uses the vehicle dynamics control sensor sets. If the system determines a large loading and loading location significantly beyond the rear axle, the vehicle has a trailer.

In step 252, the vehicle systems are monitored and/or adjusted. In step 254 the various vehicle sensors are monitored. When it is determined that the vehicle is operating in a reverse direction which may be performed in a similar manner to that described above with respect to step 230, step 256 is executed. After step 256, the steering wheel angle input 258 from the plurality of sensors is input to the system. In step 260 and as illustrated in FIG. 20, a predicted path is displayed in response to the present position and the predicted position based upon the steering input. In step 260, the current position of the trailer 160 relative to the vehicle may be displayed on display 68. As well, various predicted positions may also be displayed. The positions may be determined as a function of the current steering wheel angle and the current angle between the trailer and vehicle. Interference $I_1$ between the trailer 160 and vehicle 10 may also be displayed or highlighted so corrective actions may be performed by the vehicle operators. Video cameras may be mounted as high as possible on the trailer to determine the relative positions of the vehicle and trailer. The system would be calibrated for the specific trailer; once calibrated, no further adjustment would be needed. Specifically, camera height, the distance between hitch and trailer wheels, and the critical vehicle-trailer angle at which interference occurs may be needed. These parameters could be provided to the controller by the driver prior to use. In this embodiment, no measurement of trailer-vehicle angle would be needed.

Alternatively, if sensors were available to measure the trailer-vehicle angle, much of the calibration procedure may be made automatic. The trailer-vehicle angle may be measured in any of a number of ways: via the vehicle's backup ultrasonic backup sensors, by load cells on the hitch post, or by a mechanical means such as a retractable cable. To calibrate the system, the driver would back up to and deliberately almost jackknife the trailer. At that point he would tell the system by a type of input device that this was the critical angle. As the driver pulled forward again, the change in trailer-vehicle angle as a function of forward distance traveled could be automatically measured and used to calculate the hitch-wheel distance.

Two, three, four or five different predictions may be displayed based upon the current steering conditions. In FIG. 20, the current position $X_1$, and predicted positions $X_2$ and $X_3$ are illustrated. This will give an indication to allow the vehicle operator to correct the position of the vehicle. Also, the vehicle speed may be used as input to determine the display.

In step 262, brake-steer may be generated based upon the input. It should be also noted that the turning input in step 258 may be provided by the steering device or may be provided by a push button, a turn signal lever or other type of device.

Referring back to step 254, if the vehicle is turning in a forward direction, brake-steer may also be generated in step 262.

If the vehicle is in a forward direction in step 264, an additional step 265 may be performed before step 262. In step 265, the yaw rate desired by the vehicle operator may be determined from the hand wheel and compared to the yaw rate from the yaw rate sensor. If the yaw rate from the hand wheel varies from the yaw rate from the yaw rate sensor (which indicates that the driver's intent is not being followed), then brake-steer may be applied in step 262.

Referring back to step 254, if the vehicle is in a straight forward direction high speed condition in step 266, various conditions related to the vehicle may be determined such as the rear axle side slip angle in step 268. Also, a profile may be obtained in step 270 of the trailer behind the vehicle. That is, a camera or reverse sensing system may generate an electronic profile that indicates the vehicle is moving in a straight ahead stable condition.

Thus, in step 262, brake-steer may be generated with the trailer brakes, the vehicle brakes, vehicle suspension changes, or a combination to assist the vehicle in the reverse condition 256, turning in a forward direction from step 264, and in response to high speed straight condition from steps 266-270. Brake-steer may be provided by activating vehicle brakes in step 274, applying positive or differential torque to the wheels of the vehicle in step 276, activating the trailer brakes 278 or other combinations mentioned above. All or some of the steps 274-278 may be performed simultaneously. In addition, the vehicle loading and/or suspension position may be changed in step 280. Thus, brake-steer may be used to enhance the straight ahead high speed trailerability of the vehicle, a turning forward direction of the vehicle, and in a reverse direction of the vehicle. The straight ahead condition may be enhanced by brake-steer to a lesser extent than a turning mode.

In step 268, the rear axle side slip angle of the vehicle may be estimated and monitored. When the rear axle side slip angle is above a predetermined value together with its rate change above a certain threshold (indicating that the side slip angle is constantly crossing zero), the vehicle velocity is above a velocity threshold, and the steering wheel is about zero, and the brake-steer system determines that the vehicle is in straight line driving and the trailering is potentially unstable, brake-steer is applied to the vehicle. Notice that the controlled brake torque may be set to be proportional to the magnitude of the rear axle side slip angle and/or the magnitude of the rate change of the rear axle side slip angle.

Notice that in straight line driving, the vehicle yaw stability control usually does not activate. Hence, the brake-steer action for straight line and unstable trailering is in addition to the yaw stability control.

In step 264 a turning and trailering condition is determined. The brake-steer is activated upon the detection of a potentially unstable trailering condition. The yaw stability control tuned for normal vehicle driving is based on the driver's intention to control the over-steer or under-steer of the vehicle such that the vehicle is maintained on the driver's intended course. Since yaw error feedback and side slip feedback are used in yaw stability control, they can cause problems during turning and unstable trailering. In one aspect, the divergent trailer lateral motion would cause a fluctuation of the vehicle yaw rate and side slip angle. From yaw stability control point of view, the vehicle crosses the over-steer and under-steer boundary from time to time. Hence under-steer correction (tries to make car steer more) and over-steer control (tries to make car steer less) will activate. If those activations are not carefully done, the trailer's dynamic lateral deviation may be excited instead of controlling the trailering.

Therefore it is desirable to provide a control system to enhance the traditional yaw stability control upon the detection of the unstable trailering during a turning. Such a system uses the braking to steer the vehicle in an opposite direction of the trailer motion so as to stabilize the trailering. Such a system includes determining a presence of a trailer, determining a vehicle velocity, determining a hand wheel angle position signal of the hand wheel, determining a sensor yaw rate from the yaw rate sensor, calculating a desired yaw rate based upon the hand wheel angle position signal (which reflects the driver's intention), determining a rear axle side slip angle, and controlling the brakes of the vehicle such that the vehicle unstable trailering is eliminated.

More specifically, upon the detection of trailering in a turned vehicle, when the rear axle side slip angle is determined to be above a predetermined rear axle slip with rate change of the side slip angle above certain threshold, and the vehicle velocity is above a vehicle velocity threshold, one or more brake control commands (amount of the brake pressures) are generated based on the magnitude of the calculated rear side slip angle and the magnitude of its rate change, the yaw angular rate, and the desired yaw angular rate.

The location of brakes in which the braking pressures are sent is determined based on a simple role of thumb: to reduce the magnitude of the rear side slip angle. That is, when there is a positive rear side slip angle, the braking is applied to a wheel such that the vehicle intends to generate negative side slip angle upon the application of braking; when there is a negative rear side slip angle, the braking is applied to a wheel such that the vehicle intends to generate positive rear side slip angle upon the application of braking.

It should also be noted that the reversing direction may also be enhanced using the straight ahead condition. That is, the profile determined in step 270 may be used to maintain the trailer straight behind the vehicle if so desired. Such an input may be provided by the operator of the vehicle through the hand wheel or through a push button. Thus, after the vehicle has gone straight ahead for enough time to obtain a profile, brake-steer may be applied to the trailer and/or vehicle to maintain the trailer straight behind the vehicle until turning is desired. Thereafter, when it is determined that turning is desired, steps 256-262 may be performed.

Figure 21:
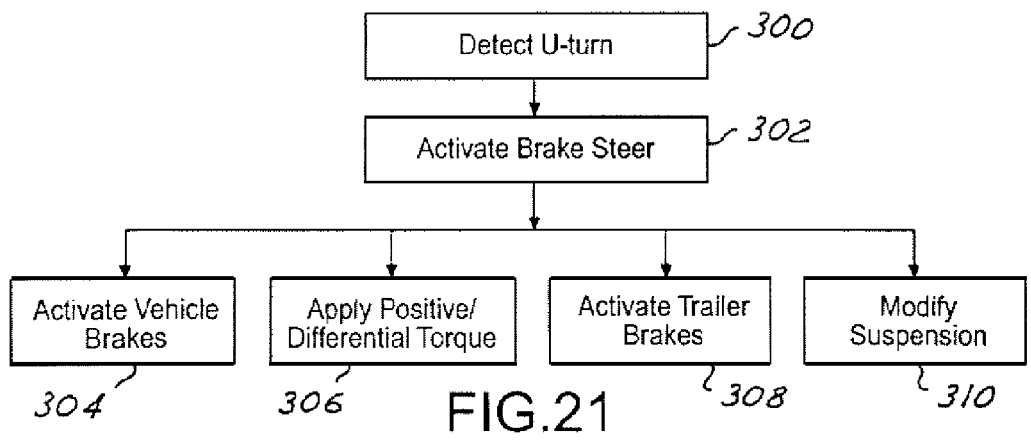
FIG. 21 is a flow chart of a fourth embodiment of the present invention.

Referring now to FIG. 21, the present invention may be used to assist a vehicle in a U-turn condition. In step 300, a U-turn is detected from the various sensors and/or inputs. For example, a push button on the instrument panel or one of the levers may be provided to assist or trigger the vehicle into an assist mode based upon a U-turn. U-turns may also be sensed. Detecting a U-turn may be formed from a steering wheel angle sensor, the wheel speed sensors, the yaw rate sensor, vehicle velocity sensor, throttle position sensor, and yaw rate sensors, or various other combinations of the sensors described above. For example, from the sensors a straight path followed by a sharp turn (SWA, SWA rate or combination) and a reduction in speed or possible stop may be an initial condition before entering a U-turn. Thereafter, an increase in speed with the steering wheel turned may indicate the vehicle is in a U-turn.

In step 302, brake-steer is activated in response to detecting the U-turn signal. Brake-steer may be maintained until a threshold is exceeded. For example, the velocity threshold may be 18 miles per hour. Brake-steer may be applied in a similar manner to FIGS. 11 and 12 except that a higher speed threshold may be used to allow for a higher speed turn. The U-turn signal may be generated within the controller.

In steps 304-310, various ways to provide brake-steer are set forth. In step 304, the vehicle brakes may be activated in order to generate brake-steer. In step 306, positive or differential torque may be applied to the vehicle to provide brake-steer. Also, if the vehicle is towing a trailer, the trailer brakes may be activated in step 308 to provide brake-steer. Further, in step 310, the suspension may be adjusted to perform brake-steer. The suspension modifications may take the form of shifting the normal loads, for example, to the appropriate wheel or articulating the active or adjustable suspension components 136*a*, 136*b*, 138*a*, 138*b*.

Figure 22:
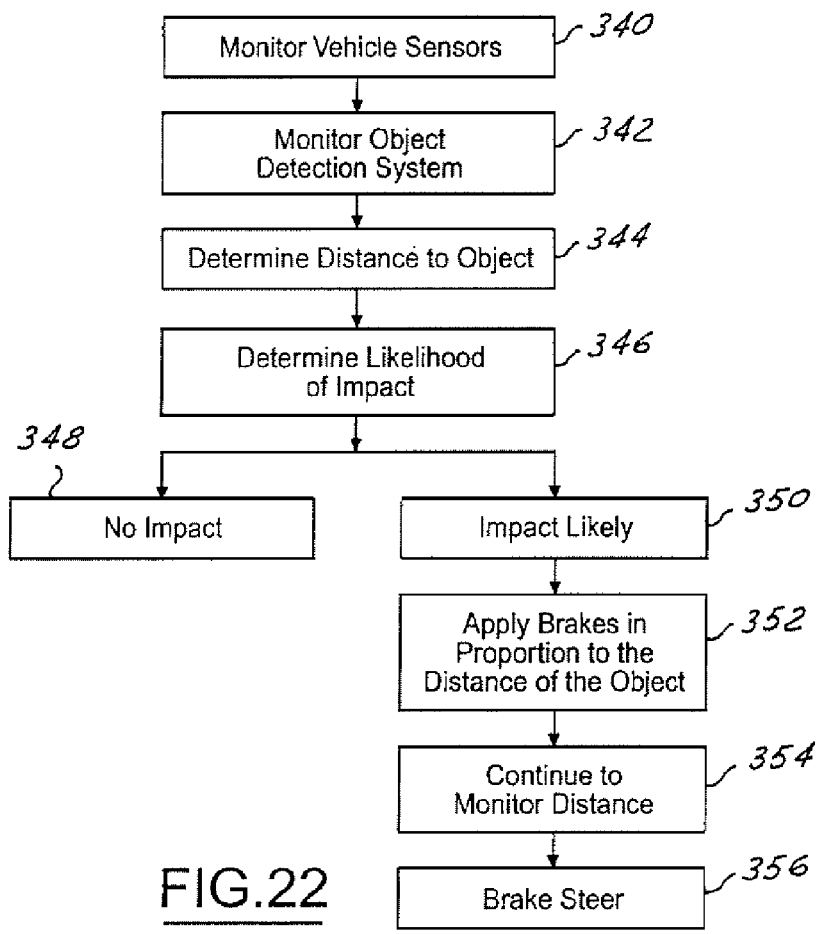
FIG. 22 is a flow chart of a fifth embodiment of the present invention.

Referring now to FIG. 22, the present invention may also be used to assist in object avoidance. In step 340, the various vehicle sensors are monitored. In step 342, the object detection system is monitored. In step 344, the distance to an object may be determined by the object detection system. As mentioned above, the object detection system may comprise the lidar, radar, sonar and cameras described above. In step 346, the controller determines the likelihood and impact based on various conditions including the object distance, relative speed, direction of the object and vehicle, etc. If there is little or no likelihood of an impact, step 348 is executed in which nothing is done. In step 346, if an impact is likely, step 350 is executed. In step 350, if impact is likely, the amount of braking may be provided in proportion to the distance to the object in step 352. For example, the closer the object, the brake, brake-steer or combinations thereof may be increased subject to prioritization constrains. In step 354, the distance to the object is continually monitored. In step 356, an amount of brake-steer may be applied to one or more of the wheels to assist the vehicle to steer away from the object to avoid a collision. Brake-steer may be applied as in the above methods by activating the brakes, applying positive or differential torque, activating trailer brakes or adjusting the suspension actively or providing a load shift to the vehicle. Thus, the brake-steer may provide a supplemental braking to the proportional braking described above.

It should also be noted that during brake-steer it may be desirable to prioritize the system so that upon driven braking the system exits or ceases brake-steering. Further vehicle speeds above a threshold or significant driver caused acceleration may cause brake-steer to cease being applied.

While particular embodiments of the invention have been shown and described, numerous variations and alternate embodiments will occur to those skilled in the art. Accordingly, it is intended that the invention be limited only in terms of the appended claims.

The invention claimed is:

1. A method of controlling an automotive vehicle having a controllable suspension component, said vehicle having a first turning radius comprising:
   applying brake-steer to at least one wheel to provide a second turning radius less than the first turning radius;
   generating a suspension control signal in response to applying brake-steer; and articulating at least one wheel coupled to the controllable suspension component to provide a third turning radius of the vehicle less than the second turning radius.

2. A method as recited in claim 1 wherein applying brake-steer comprises applying at least one brake at a first wheel.

3. A method as recited in claim 1 wherein applying brake-steer comprises applying an increased drive torque to a second wheel relative to a first wheel.

4. A method as recited in claim 1 applying brake-steer comprises increasing a normal load on a rear wheel.

5. A method as recited in claim 1 applying brake-steer comprises increasing a normal load on a front wheel.

6. A method as recited in claim 1 further comprising detecting a parking mode and applying brake-steer in response to a parking mode.

7. A method as recited in claim 6 wherein detecting a parking mode comprises detecting a parking mode in response to a vehicle speed.

8. A method as recited in claim 6 wherein detecting a parking mode comprises detecting a parking mode in response to a steering wheel angle.

9. A method as recited in claim 6 wherein detecting a parking mode comprises detecting a parking mode in response to a map correlating vehicle speed and a steering wheel rate to a parking/non-parking condition.

10. A method as recited in claim 6 wherein detecting a parking mode comprises detecting a parking mode in response to a driver-actuated switch.

11. A method as recited in claim 1 wherein articulating one wheel comprises articulating two wheels.

12. A method as recited in claim 11 wherein the two wheels are coupled to a solid axle.

13. A method as recited in claim 1 wherein articulating at least one wheel coupled to the controllable suspension component comprises articulating using a Hotchkiss suspension.

14. A method as recited in claim 1 wherein articulating at least one wheel coupled to the controllable suspension component comprises articulating using an electrically controllable bushing.

15. A method as recited in claim 1 wherein articulating at least one wheel coupled to the controllable suspension component comprises a solenoid locking mechanism.

16. A method as recited in claim 1 wherein articulating at least one wheel coupled to the controllable suspension component comprises a locking mechanism with a compliant rear suspension mount.

* * * * *